(12) United States Patent
Robinson

(10) Patent No.: US 8,381,454 B1
(45) Date of Patent: Feb. 26, 2013

(54) SEGMENTED, ELONGATED, EXPANDABLE, 4-SEASON, DOUBLE-WALLED, LOW-COST, RIGID EXTRUDED PLASTIC PANEL STRUCTURES

(76) Inventor: Markus R. Robinson, Corvallis, OR (US)

( * ) Notice: Subject to any disclaimer, the term of this patent is extended or adjusted under 35 U.S.C. 154(b) by 34 days.

(21) Appl. No.: 13/081,307

(22) Filed: Apr. 6, 2011

Related U.S. Application Data

(63) Continuation-in-part of application No. 12/692,064, filed on Jan. 22, 2010.

(60) Provisional application No. 61/322,153, filed on Apr. 8, 2010, provisional application No. 61/146,825, filed on Jan. 23, 2009.

(51) Int. Cl.
*E04H 1/00* (2006.01)

(52) U.S. Cl. ............... 52/79.5; 52/63; 135/97; 135/159

(58) Field of Classification Search .................. 135/97, 135/100, 121, 122, 159, 116, 119, 143; 52/63, 52/82, 91.1, 91.3, 270, 284, 79.5
See application file for complete search history.

(56) References Cited

U.S. PATENT DOCUMENTS

| | | | | |
|---|---|---|---|---|
| 34,569 | A * | 3/1862 | Fitzgerald | 135/99 |
| 214,996 | A * | 5/1879 | Doane | 135/100 |
| 388,424 | A * | 8/1888 | Lindblad | 52/70 |
| 988,400 | A * | 4/1911 | Stonebridge | 135/99 |
| 1,481,019 | A * | 1/1924 | Luebbert | 52/83 |
| 1,728,356 | A * | 9/1929 | Morgan | 135/154 |
| 1,806,354 | A * | 5/1931 | Lange | 52/82 |
| 1,848,690 | A * | 3/1932 | Bayley et al. | 52/82 |
| 2,425,279 | A * | 8/1947 | Harris | 135/147 |
| 2,530,765 | A * | 11/1950 | Greenup | 135/98 |
| 2,864,389 | A * | 12/1958 | Smith et al. | 135/98 |
| 2,865,387 | A * | 12/1958 | Annibaldi | 135/145 |
| 2,904,850 | A * | 9/1959 | Couse et al. | 52/36.2 |
| 2,928,404 | A * | 3/1960 | Klages | 135/98 |
| 2,967,534 | A * | 1/1961 | Silye | 135/143 |
| 3,016,115 | A * | 1/1962 | Harrison et al. | 52/18 |
| 3,119,153 | A * | 1/1964 | Martin | 52/82 |
| 3,139,958 | A * | 7/1964 | De Witt | 52/70 |
| 3,152,366 | A * | 10/1964 | McCrory et al. | 52/79.4 |
| 3,169,543 | A * | 2/1965 | McGerty | 135/152 |
| 3,277,620 | A * | 10/1966 | Martin | 52/82 |
| 3,281,999 | A * | 11/1966 | Lebson et al. | 52/82 |
| 3,333,376 | A * | 8/1967 | Marsters | 52/82 |
| 3,375,831 | A * | 4/1968 | Serbus | 135/121 |
| 3,376,879 | A * | 4/1968 | Huddle | 135/97 |
| 3,605,771 | A * | 9/1971 | Fox et al. | 135/90 |
| 3,714,749 | A * | 2/1973 | Aitken | 52/70 |
| 3,727,355 | A * | 4/1973 | Vachon | 52/82 |
| 3,766,693 | A * | 10/1973 | Richards et al. | 52/71 |
| 3,835,602 | A * | 9/1974 | Tuuri | 52/82 |

(Continued)

*Primary Examiner* — William Gilbert
*Assistant Examiner* — James Ference
(74) *Attorney, Agent, or Firm* — Markus Robinson; Scott Younger; Larry Rutstrom

(57) ABSTRACT

Low-cost, semi-permanent rigid-wall modular longhouse-type, peaked-roof structures, stadium-shaped (in plan view), made of light-weight, water-proof cellular extruded plastic sheet material die cut into blanks that are easily portable, quickly field erectable and dismountable by unskilled workers for a wide variety of uses. Two semi-circular end portions are spaced apart and joined by multiple segments of straight wall and roof modules, the length depending only on the number of intermediate segments. Blanks are easily folded on site into double-walled, bolt-together, modular wall and roof panels. Only four basic panel configurations are needed to form all structural elements. Multiple modular structures may be grouped to form larger compound structures with individual ones assigned to individual persons or dedicated work space usages: disaster shelters, sleeping, gathering, storage, hygiene, medical treatment, schooling, entertainment, goods manufacture, cooking, eating, herding, etc. Double-wall modules provide inter-stitial space for cold-weather insulation and passive ventilation in hot environments.

20 Claims, 8 Drawing Sheets

U.S. PATENT DOCUMENTS

| | | | | |
|---|---|---|---|---|
| 4,034,772 | A * | 7/1977 | Huddle | 135/119 |
| 4,064,662 | A * | 12/1977 | O'Toole | 52/71 |
| D246,990 | S * | 1/1978 | Rain | D25/21 |
| 4,112,956 | A * | 9/1978 | Small | 135/99 |
| 4,133,149 | A * | 1/1979 | Angress | 52/70 |
| 4,537,210 | A * | 8/1985 | Montgomery | 135/87 |
| 4,542,759 | A * | 9/1985 | Kyner, Jr. | 135/122 |
| 4,632,138 | A * | 12/1986 | Irwin | 135/143 |
| 4,633,626 | A * | 1/1987 | Freeman et al. | 52/71 |
| 4,640,061 | A * | 2/1987 | Trumley | 52/71 |
| 4,651,479 | A * | 3/1987 | Kersavage | 52/80.1 |
| 4,663,898 | A * | 5/1987 | Yacaboni | 52/82 |
| 4,672,779 | A * | 6/1987 | Boyd | 52/79.4 |
| 4,707,953 | A * | 11/1987 | Anderson et al. | 52/63 |
| 4,739,597 | A * | 4/1988 | Voegeli et al. | 52/223.7 |
| 4,850,160 | A * | 7/1989 | Mullin, Jr. | 52/82 |
| 4,879,850 | A * | 11/1989 | Glassco et al. | 52/82 |
| 5,033,243 | A * | 7/1991 | Worms et al. | 52/245 |
| 5,373,863 | A * | 12/1994 | Prizio | 135/97 |
| 5,555,681 | A * | 9/1996 | Cawthon | 52/63 |
| 5,918,614 | A * | 7/1999 | Lynch | 135/95 |
| 5,964,065 | A | 10/1999 | Migurski et al. | |
| 6,129,102 | A * | 10/2000 | Carter | 135/145 |
| 6,295,768 | B1 * | 10/2001 | Romero | 52/82 |
| 6,390,110 | B1 * | 5/2002 | Brown | 135/93 |
| 6,502,593 | B1 * | 1/2003 | Stafford | 135/115 |
| 6,520,195 | B1 * | 2/2003 | O'Neal et al. | 135/94 |
| 6,532,701 | B2 * | 3/2003 | Williams | 52/71 |
| 6,554,013 | B2 * | 4/2003 | Brown | 135/93 |
| 6,658,800 | B2 * | 12/2003 | Monson et al. | 52/81.1 |
| 6,742,533 | B2 * | 6/2004 | Olson | 135/95 |
| 6,892,744 | B2 * | 5/2005 | Feldpausch et al. | 135/146 |
| 7,448,400 | B2 * | 11/2008 | Jensen | 135/121 |
| 7,600,348 | B1 * | 10/2009 | Kostka | 52/63 |
| 8,042,562 | B1 * | 10/2011 | McDaniel, Jr. | 135/97 |
| 2004/0238021 | A1 * | 12/2004 | Holub et al. | 135/97 |

* cited by examiner

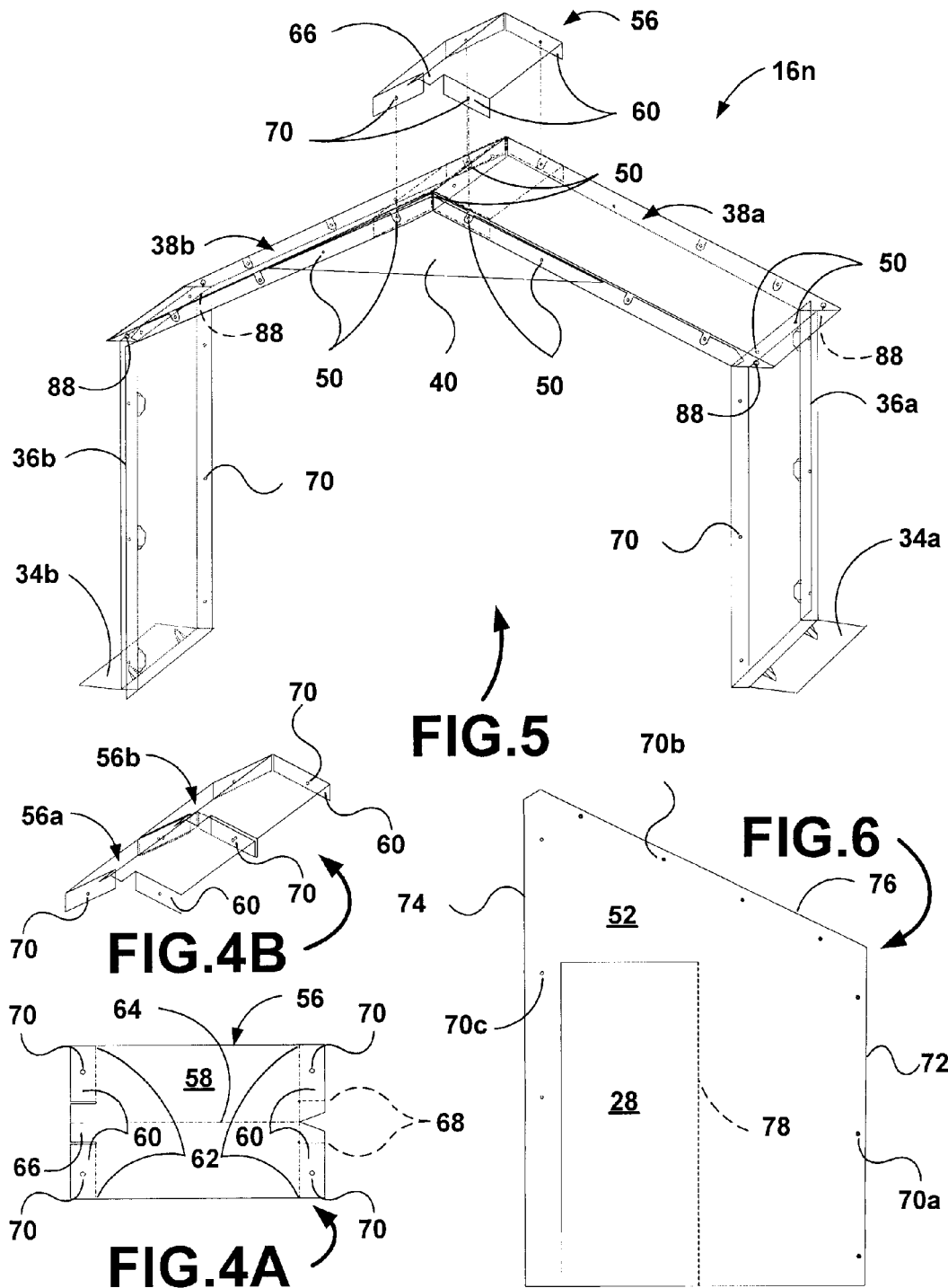

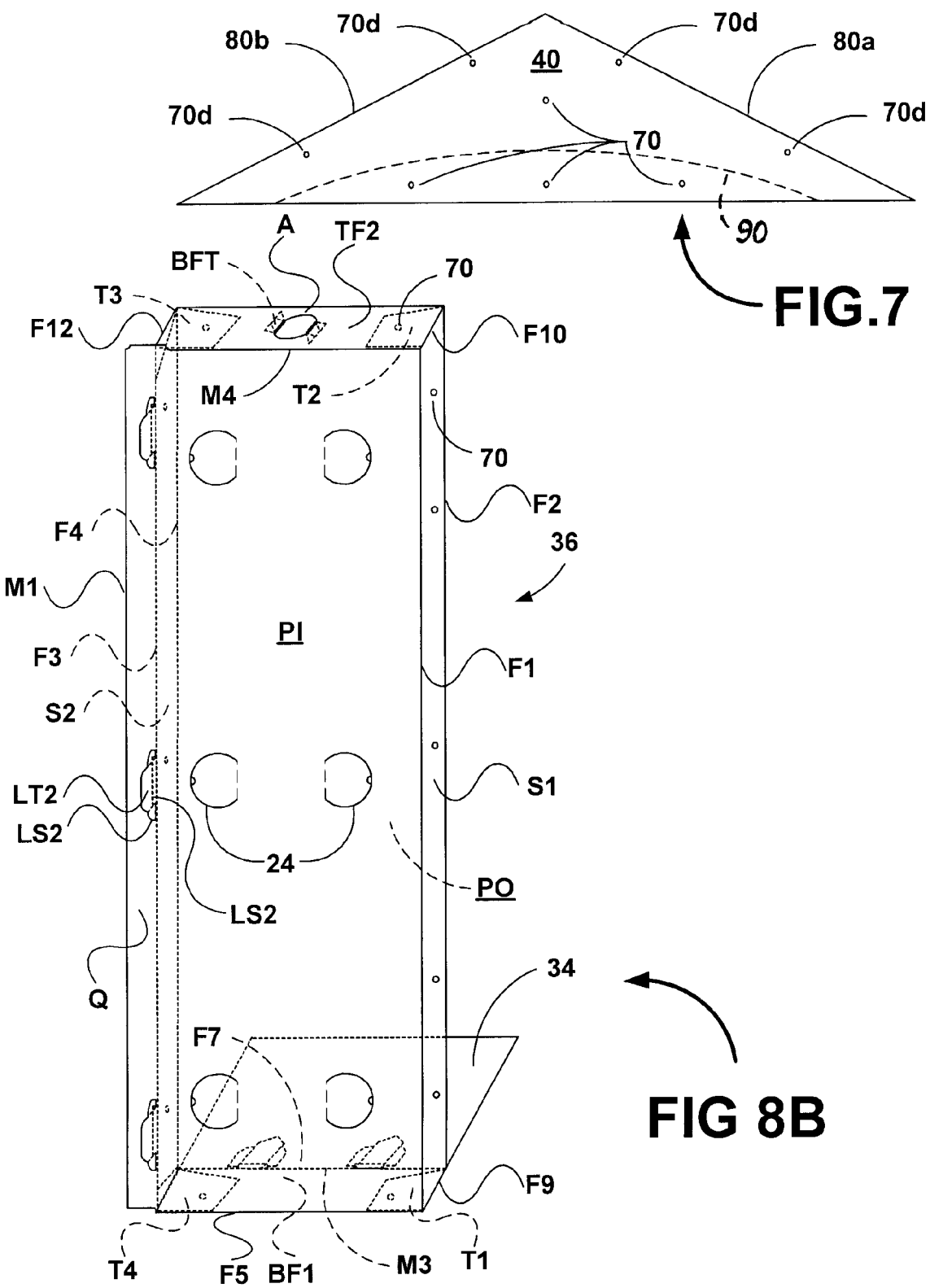

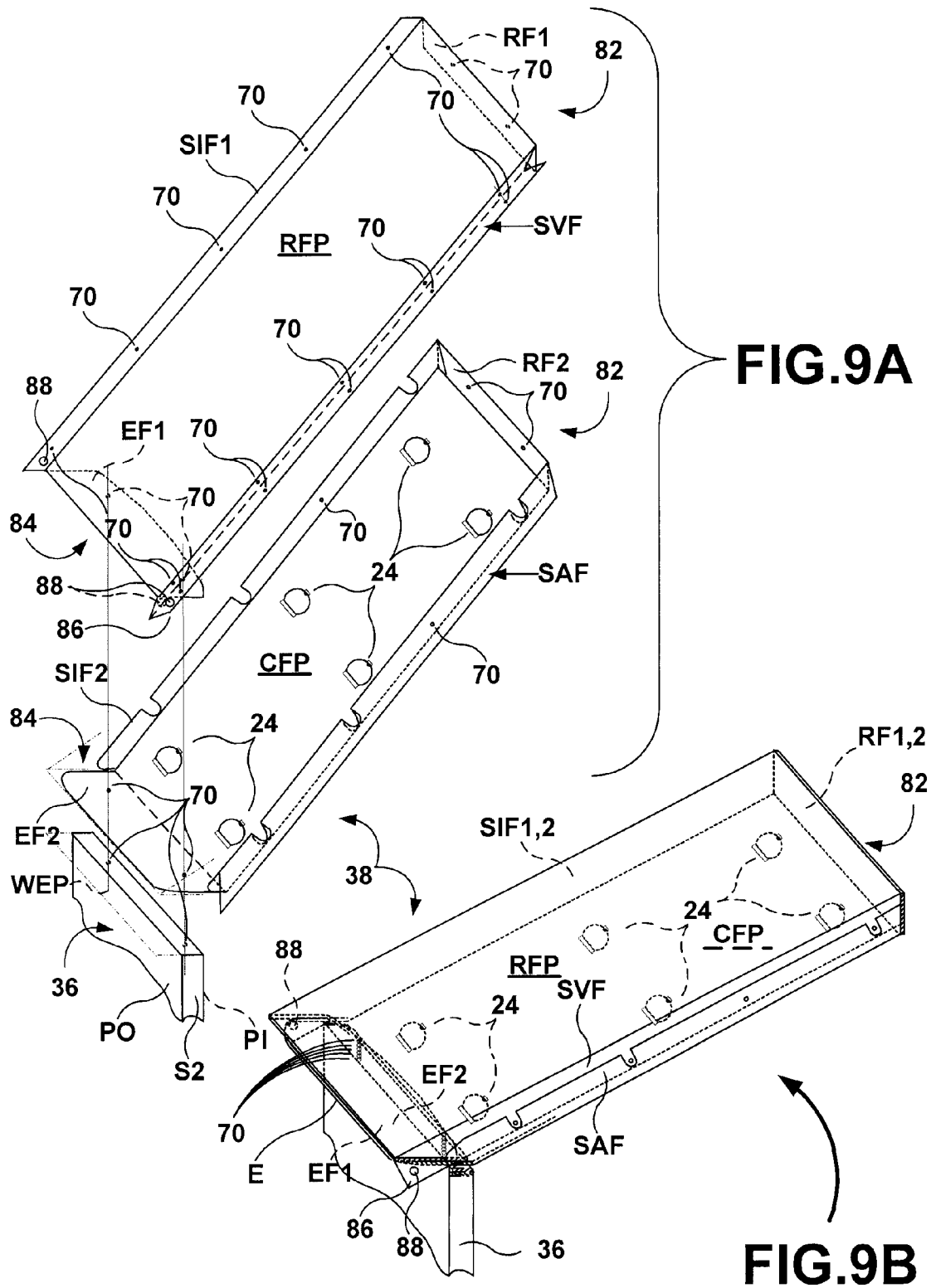

SEGMENTED, ELONGATED, EXPANDABLE, 4-SEASON, DOUBLE-WALLED, LOW-COST, RIGID EXTRUDED PLASTIC PANEL STRUCTURES

CROSS-REFERENCE TO RELATED CASES

This application is the Regular US Patent Application corresponding to U.S. Provisional Application filed by the same inventor, on Apr. 8, 2010, U.S. Ser. No. 61/322,153, entitled Four-Season, Double-Walled Folded Homes SegYurts; This application is also a CIP of copending U.S. Ser. No. 12/692,064 entitled Semi-Permanent, 4-Season, Modular, Extruded Plastic, Flat Panel, Insulatable, Portable, Low-Cost, Rigid-Walled Structures filed on Jan. 22, 2010 by Markus F. Robinson, which in turn is the Regular US Patent Application corresponding to U.S. Provisional Application of the same title, filed by the same inventors, on Jan. 23, 2009, U.S. Ser. No. 61/146,825, the priority of said applications is claimed under 35 US Code, §§111 ff, including §§119 and 120.

FIELD

The invention relates to elongated, segmented, expandable, low-cost, double-wall, 4-season structures having a stadium-shaped footprint (as seen in plan view), made of modular, light-weight, water-proof cellular extruded-plastic rigid sheet panels that are easily hand-portable, quickly field-erectable and dismountable. The inventive segmented structures, also termed longhouses, have a wide variety of uses, primarily as temporary yet semi-permanent 4-season shelters for campers, field workers, military personnel, triage facilities, and for low income and displaced persons, including disaster and conflict refugee shelters. The blanks for the modular panels of the structure are easily die-cut from any water-resistant, non-metallic, rigid material, preferably an extruded plastic, such as a polyolefin polymer. Each of the inventive structures comprises a pair of spaced-apart semi-circular half-yurt end portions which are joined by a plurality of modular intermediate straight segments, the length of the structure being selectable and determined by the number of intermediate segments used. Only a few panel configurations are needed to form all the necessary elements of the structure. Multiple modular segmented structures may be grouped to form larger compound structures with individual ones being assigned to particular space usages: sleeping, gathering, storage, hygiene, medical treatment, schooling, entertainment, manufacture, cooking, eating, herding, etc. The double-walled structures provide spaces between the walls for inter-panel insulation for cold-weather environments and passive ventilation in hot-weather environments.

BACKGROUND

There is an urgent need for low-cost temporary structures to house people and animals in the event of natural disasters and for refugees from conflict areas, not only for housing, but also for medical triage, food preparation and supplies storage. Although tents are the currently-used solution, they are inadequate for a wide range of reasons, including low internal height, relatively short life, relatively frangible, relatively impermanent in inclement weather, not insulated, subject to collapse in heavy snow-load environments, and for the more sophisticated, advanced material type of expedition tents, much too expensive.

In cases of natural disaster, there is an immediate unmet need for longer term useable structures, having a useful-life of on the order of 2-6 years until permanent housing is constructed for the homeless. A prime example is the 2004 Christmas tsunami that developed from a 9.1 magnitude subsea earthquake off the SW coast of Sumatra. The earthquake triggered a series of devastating tsunami along the coasts of most landmasses bordering the Indian Ocean, killing more than 225,000 people in eleven countries, and inundating coastal communities with waves up to 30 meters (100 feet) high. It was one of the deadliest natural disasters in recorded history. Indonesia, Sumatra, Sri Lanka, India, and Thailand were hardest hit.

Similar disaster examples are the refugee situations resulting from the magnitudes 7.1 and 6.0 Haiti earthquakes of Jan. 13 and 19, 2010, the 9.0 Sendai-Japan earthquake followed by monster tsunami on Mar. 11, 2011, and those resulting from the conflicts in Gaza, Somalia, Libya and the ethnic wars in various African countries. In all there total millions of displaced persons living in the open or in frayed tents in refugee camps, or huts of mud and dung wattle, discarded sheet metal, cardboard and worn sheets.

Even more prevalent are the estimated 1 billion squatters and homeless in the world. In almost all of the world's countries there are extensive slums, favelas, barrios, or shanty towns, typically on the edges of major cities and consisting almost entirely of self-constructed housing built of scraps of material without the landowner's permission. While these settlements may in time grow to become both legalized and indistinguishable from normal residential neighborhoods, they start off as "squats" with minimal basic infrastructure: no sewage system or drinking water, and if there is electricity, it is stolen from a nearby cable.

Temporary shelters are also used at conventions, trade shows, fairs and festivals, sporting events, for farm stands, and along trails or at camp grounds, to name a few.

There have been a number of design attempts in the prior art for temporary, rapid construction, light weight or field shelters, among them being: Zwern US Published Application 2009/0272-043 disclosing hexagonal yurts that can be clustered, made of corrugated, foam core, Al-faced polyisocyuranate panels. Both the side walls and roof are each made of one continuous panel. There is no roof or gutter overhang, and the roof is glued to the walls, and a cable is used to form tension rings top and bottom to hold it together. A complex cross-rib foundation system is used to support the floor. Since the walls and roof are multiple continuous perimetral panels, this structure is not easily man-portable for field erection as a temporary shelter.

Pascoe U.S. Pat. No. 5,319,904 discloses a clusterable prefab structure using arcuate surface panels to form a frustrum. Uses inner and outer fiberglass or Kevlar layers that are insulated between with foamed-in polyurethane. The structure appears to have primarily military use, in which the adjacent side wall, roof and floor panels are hermetically sealed by inter-engaging dados and grooves cinched together by external flanges and bolts, top and bottom.

Sadler U.S. Pat. No. 5,184,436 shows a portable rectangular structure of the Dutch barn style, having a slant roof and central ridge made of a continuous, multi-panel sheet forming both side walls and roof, with separate end panels. The sheet material is corrugated extruded polyethylene, and the two inwardly slanted side panels include exterior flaps that serve as hold-downs by use of sandbags. A yurt-type structure is not disclosed, nor is the structure easily clusterable.

Monson U.S. Pat. No. 6,658,800 discloses a dome made of a plurality of quadrilateral compound convex panels. They are double-walled panels, thermoformed of high-density polyethylene, which are joined at a lip-seam edge.

Yacoboni U.S. Pat. No. 4,784,172 discloses an emergency shelter of three-section combined wall and roof panels forming a pointed-top dome made of single layer corrugated plastic, held together with clips securing adjacent panels along external flanges/ribs. A box and support belt assembly may be used by a man carrying a bundle of the pre-folded panels into the field.

More complex and less pertinent ideas are illustrated in still other patent references; Tuczek U.S. Pat. No. 6,282,849 being directed to a highly complex exercise in proposing polyhedron dome buildings made of triangular panels interspersed with, and connected to, prismatic beams. The panels and beams are not for temporary, field erectable structures, being proposed as concrete beams supporting SIP panels of plywood with foamed interior layers.

Andrieux U.S. Pat. No. 5,715,854 discloses an igloo made of bowed panels pleated at the upper edge to compensate for curvature deformation. The panels are single-layer and connected by side edge, ball-and-socket connectors. The roof dome top is a single convex piece.

Daugherty U.S. Pat. No. 4,073,105 discloses a toy or display structure formed of trapezoidal or triangular structures made of single piece, rigid plastic or metal panels, having curled edges that slidingly interlock. A single roof panel having creases forming edges of a shallow pyramid is provided.

Murdock U.S. Pat. No. 6,085,485 discloses steel SIPs formed of two spaced sheet steel sheets (skins) having Z or C internal connecting ribs with insulation provided between the two skins. Overlapping edges of panels are connected by self-sealing Tek fasteners.

Ferguson U.S. Pat. No. 6,598,363 discloses a modular single ridge barn-like structure made of corrugated single-layer panels having side edge margins that include alternating tabs and eyes for linking panels together along the edges. Prefab eave and ridge beams having holes and pegs join a gable roof made of the same panels to the vertical side walls. Although no materials are specified, the corrugated form of the sheets appear to be steel, aluminum or fiberglass.

Icosa Village U.S. Pat. No. 6,895,772 is directed to multiple panels folded into modular polygonal beams that interlink, first into triangular modular double-walled panels, and in turn the triangular panels are assembled into icosahedral dome structures. Tetrahedral windows may be inserted in the center opening of the triangular modules.

Finally, Domes for the World, (177 Dome Park Place, Italy, Tex., 76651), discloses its mission is to provide low cost, rebar-reinforced, permanent concrete dome shelters for third-World regions. The DFTW system uses an air inflated dome atop cylindrical wall forms that are sprayed with concrete over rebar to make a monolithic shell.

While these approaches suggested in the prior art are interesting, for the most part they are complex, not light-weight or modular enough to be simply portable, do not address all the needs of a semi-permanent, sound, fully functional shelter, that is simple to install in the field by unskilled workers, yet results in a highly robust structure that is clusterable into a wide variety of configurations to provide for a wide range of needs over many years of use.

Accordingly, there is a pressing need for improvements in rugged, temporary shelters that are low cost, simple to manufacture, light weight for easy portability to an erection site, simple to erect by unskilled manual labor without complex tools, yet are weather and pest-proof and flexible in design to provide cluster-buildings for a wide range of housing and support uses for extended service life. Perhaps most importantly, the structures should not be limited to round-footprint, non-expandable structures, but rather should have provision for expandability as needs and uses dictate.

THE INVENTION

Summary, Including Objects and Advantages

The invention comprises an elongated, segmented, expandable, low-cost, semi-permanent, stadium-shaped (in plan view), peaked-roof, rigid, double-walled structures made of modular, light-weight, water-resistant, die-cut sheet goods panels that are self-sustaining (self-standing). The elongated shape, in plan view, may also be characterized as a "longhouse" shape. Each of the inventive structures comprises a pair of spaced-apart semi-circular half-yurt end portions which are joined by one or more modular intermediate straight segments, comprising joined vertical wall and inclined, roof panels. Thus, the inventive structure is modularly expandable, the length of the structure being selectable and determined by the number of intermediate straight segments used. The semi-circular end portions and strait segment walls and roof panels are all double walled.

A presently preferred example of panel material is the use of linear cell-type (cells parallel to the longitudinal axis of the panel length) extruded plastic sheet which is die cut into unfolded panels. The package of a plurality of panels required for assembly into a modular segmented structure is light enough in weight to be easily portable by manpower, mule, horse or camel. They are easily folded into the double-walled modular panel units, then field-assembled into fully erected structures without the aid of tools or scaffolding, and may be disassembled for moving the structure as needed. The individual inventive segmented structures are modular and universal, in that they have a wide variety of uses, primarily as temporary yet semi-permanent (up to a half-dozen years use) shelters for campers, low income and displaced persons, such as disaster and conflict refugee shelters, and for medical triage, food preparation and supplies storage.

The panel blanks are easily die-cut from extruded flat plastic sheets. The sheets, in cross section are characterized as having a pair of parallel, spaced continuous exterior walls, having an outer-face-to-outer-face thickness on the order of $\frac{1}{8}$" to $\frac{5}{16}$" (3-14 mm), preferably about $\frac{3}{16}$"-$\frac{5}{16}$". The exterior walls of the sheets are on the order of 1-3 mm thick. Webs or ribs extend between and join the parallel outer walls of the sheet goods. These internal ribs are oriented generally normal to the parallel outer walls and are spaced from about $\frac{1}{8}$ to $\frac{1}{4}$" apart. The resulting extruded sheets present a cross-section of multiple adjacent rhomboidal channels. The sheets are self-standing, and relatively rigid but somewhat flexible, primarily transverse to the direction of the internal ribs. The wall and roof material sheets are formed from a wide variety of materials, such as plastic sheets, monolithic sheets formed by melt extrusion of a polyolefin polymer, polyethylene being presently preferred. By "blank" herein is meant a die cut and scored, but not-yet folded sheet of material that when folded and interlocked forms a modular double-walled "panel" of the inventive structures. Thus, a "panel blank" refers to the flat sheet goods that are die cut, ready for folding and assembly. "Double-walled" refers to the geometry of the as-formed modular structural unit, called a "panel" or "panel member", in which the inner and outer wall are spaced apart, on the order of from 1-8", the intermediate space of which can be filled with insulation or light weight concrete, the latter for increased structural stability and useful life.

In an alternate implementation, the panel blank sheet goods may be made as a laminate, gluing or melting (heat or RF bonding) a first face and a second face together with a corrugated sheet between, an example being a corrugated plastic or cellulosic material such as kraft paper that has been impregnated with a plastic material for water resistance. In addition, other types of plastic may be used, including more advanced plastics, co-polymer and ter-polymer plastics, and laminates of plastics with paper, metal and other materials. Panels may be formed of any weather resistant, durable, semi-rigid material having the characteristics of: 1) memory (to retain crease lines); 2) sufficient rigidity to remain planar across the surface of the panels; 3) sufficiently foldable to make and retain creases that approach 180°; and 4) sufficiently resilient so that folded seams do not break with repeated folding.

The panel sheet goods materials may, and preferably do, incorporate a fire retardant material. The presently preferred polyethylene material is an opaque, but a translucent white color, for a pleasant diffuse illumination on the interior by ambient external light. But panel material may be opaque, or transparent, as whole panels or in sections of the panels. The panel materials may incorporate a color or may be painted. The materials and configurations of the various opaque, translucent or transparent sections may easily be selected by those skilled in the art, with the primary restraint being the cost of materials and fabrication of the more advanced materials.

Only a few panel configurations are required to fabricate an entire structure. The modular, planar, identical panels may be interlocked or fastened together in a wide range of variations to form all the necessary elements of the structure. Since there are a plurality of upstanding side walls, typically from about 6 to 10 in number at each rounded end, and from 1-N (any number desired) intermediate segments, the plan view (footprint) is a stadium shape. That is, each end is semi-circular, with each semi-circular end being joined by a plurality of straight segment sections, the length being determined by the number of segments used between the ends. The roof panels of the semi-circular end portions are triangular in plan view, while the wall panels of both the semi-circular end portion and the straight segments are rectangular in vertical side view, with the long axis oriented vertically when erected. The roof panels of the straight segments are also rectangular in plan view. The only single layer modular panels are the roof ridge cap panel, roof gusset, room divider, interior doors, and optionally, a window module.

Overlapping, ridge cap panels are employed to seal the seam along the ridge where each pair of straight segment roof panels join along the longitudinal center axis of the longhouse structure. The ridge cap panels include a tab at a first, forward end, that fits under the back end of the adjacent panel, resulting in a shingle-lap seal. The ridge cap panels are preferably mono-layer, that is, they are not spaced double-walled panel structures, although they may include multiple, laminated layers when needed for additional thickness. Typically, a single sheet of the type used for the wall and roof panel members as described above, is used. An optional, but preferred, triangular mono-layer, or laminated plural layer, gusset is used as a transverse ceiling beam bolted between adjacent strait segment roof panels for reinforcement. They are secured between the adjacent strait wall segments by the same bolts that secure the roof panels together. The triangular gusset may extend laterally from wall to wall of the straight segment, or may be shallow enough as to not extend laterally from wall to wall. Alternately, a scissor truss shape or arch shaped gusset may be used, in which the gusset outer edge is vertical and interlocks with walls of adjacent straight segments.

Another important option is the provision of single sheet panels that serve as room dividers between straight wall segments, or between the straight wall segment portion of the longhouse structure and the semi-circular end portions. These wall dividers may be unitary, or may include die cuts defining doors that are hinged along one vertical side to open. In these panels the ribs or webs are oriented vertically to permit back and forth folding of the door cut-out without the need for hinges. These wall dividers may extend laterally fully across the width of the straight segment or may be limited to only a fraction of the width. They may be placed, for example, every $3^{rd}$ to $5^{th}$ segment extending outwardly from the same inner side wall of the straight segment portion of the longhouse, in which case a gallery or passage is created adjacent the opposite inner wall. Or they may be staggered out from opposing inner side walls for a sinusoidal path through the longhouse. These room divider panels are fastened between adjacent straight segments, being bolted in common between the two adjacent segments. While the room divider panels typically extend up between adjacent ceiling panels, between which they are bolted, they may extend vertically upwardly only part-way, thus forming cubicles within the longhouse structure. Likewise, these room divider panels may be used in the semi-circular end portions to subdivide it into pie-shaped areas (as seen in plan view).

In addition, multiple similar modular segmented structures may be grouped, to form larger compound structures with individual ones of the segmented being assigned to individual persons or dedicated work space usages: sleeping, gathering, storage, hygiene, medical treatment, schooling, entertainment, goods manufacture, cooking, eating, etc., work spaces. The grouped segmented structures may all be of the same length or may be of different length, that is, have different numbers of intermediate segments. In addition, the elongated segmented structures of the present invention may be grouped with or interconnected by one or more round (in plan view) Yurt-type structures of the aforementioned co-pending Ser. No. 12/692,064.

The 'origami architecture' nature of the inventive segmented, elongated, expandable, structures permits creating 3-Dimensional self-standing, rigid-walled shelters from unfolded 2-dimensional flat panel components, which makes these shelters very efficient to ship "flat", in kit-type bundles of all the panel sheets necessary to field-construct an inventive segmented structure (optionally with all included fastening hardware) to remote locations, where disaster disruption of local infrastructure makes delivery of larger building components and assembly equipment highly problematical.

The inventive segmented structures are configured in a range of included sizes, lengths and features, ranging from basic to more complex. Unique features of the inventive rigid-wall segmented structures include:

Up to full man-height (standard 6') at the eaves and taller in the center of the peaked roof;

Dry Interior implemented by a simple but extremely effective interlocking gutter connections for the wall and roof panel intersections that render the interior truly waterproof without the use of tapes, glues, or other advanced material sealing techniques;

Insulatable—the modular, repeat-panel configuration permits the structure to be configured with a double wall, permitting insulation by use of any locally available biomass inserted between the walls by hand, such as straw, packaging foam scraps, rushes, crumpled newspaper, and the like;

Passive Ventilation between double-walled wall and roof panels;

Use of pressure seals to create wind and waterproof walls in double-walled implementations The use of panel sheet material like polypropylene, that has both sufficient rigidity and also sufficiently flexibility to create a face-to face seal, permits the creation of such a pressure seal;

Genuine modularity at the shelter level that permits individual shelters to be connected to many other shelters so that a huge number of multi-room shelters may be arranged in an inter-connecting compound structure;

Customizable—each of the inventive shelter modules is customizable with a wide variety of full door, half-door (Dutch door) and window panel optional accessories, all using the same panel folding and interlocking techniques, not only at the semi-circular end sections, but in any selected intermediate straight segment;

Internally lockable, bolting doors and window panels;

Apertured, water-tight, roof panel that permits installation of through-the-roof chimneys for an internal wood-burning stove or other heating device that produces a hot exhaust or for hot weather ventilation;

Inter-connection panels configured as short, enclosed tunnels permitting direct linking of spaced-apart, inventive segmented, elongated, expandable, modular structural units to each other, or to modular round Yurt-type structures together at ends or sides, or as intermediate structures joining other segmented, elongated structures of this invention, or the short enclosed tunnels may be used for entrances to individual structures; these tunnel panels can be oriented normal to a side wall panel of a half-round end or a straight intermediate segment, or may be oriented at an angle thereto, forming angular exterior additions; and Ground flaps, comprising extensions of the walls that are folded, preferably outward (but may be folded inward), to provide rain splash protection, and a foot on which rocks, dirt or other materials may be piled to anchor the structure to the ground for protection against wind blow-away.

Thus, one skilled in the art will recognize that it is straightforward to design a wide range of alternative panel configurations and the combination and placement of the internal roof gusset and room divider panels.

BRIEF DESCRIPTION OF THE DRAWINGS

The invention is described in more detail with reference to the drawings which together will assist in understanding forming and assembling the inventive structures described in the Specification, in which:

FIG. 4A is a plan view of a die cut sheet of a ridge cap panel showing an overlap tab at one end;

FIG. 4B is an isometric view of a pair of folded ridge cap panels in shingle-lapped relationship when mounted over the ridge juncture of two roof panels;

FIG. 5 is an isometric view of a single, longitudinal wall segment including roof panels joined at the ridge, as assembled, and with the ridge cap panel member being shown exploded away;

FIG. 6 is a plan view of a half, ceiling to floor divider wall panel having a die cut doorway;

FIG. 7 is a plan view of a die cut sheet of a triangular roof reinforcing gusset;

FIG. 8B is an isometric view of the double-walled wall segment formed by folding and interlocking the several panel segments defined in the die cut sheet of FIG. 8A;

FIG. 9A is an isometric, exploded view of a pair of die cut sheets from which a double-walled roof panel of a longitudinal segment of the longhouse is made, being shown in these views as folded but not interleaved;

FIG. 9B is an isometric view of the pair of die cut sheets of FIG. 9A now shown in the fully assembled form and secured to the top of a double-walled, wall panel as shown in FIG. 8B;

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. For example, many of the access portals die cut into the interior panels of the double-walled yurt which permit access to the vertical studs and ceiling trusses for insertion and tightening of the connecting bolts and wing nuts are not shown, so as to not clutter the drawings. It should be understood that such die cut access portals may be provided in locations as needed for convenient access to accomplish ease of fastening during assembly. Thus, the best mode embodiment of one feature may be shown in one drawing, and the best mode of another feature will be called out in another drawing.

All publications, patents and applications cited in this specification, including U.S. Ser. No. 12/692,064, either directly or through Internet links, are herein incorporated by reference as if each individual publication, patent or application had been expressly stated to be incorporated by reference.

For details of the construction of the semi-circular end portions of the inventive longhouse structure, each of which is half a round Yurt, reference is made to copending U.S. Ser. No. 12/692,064, the text, drawings and appendices of which are hereby incorporated by reference. That application shows the details of the round Yurt manufacture, assembly of individual wall and triangular roof panels, and their erection into a round Yurt. One skilled in the art will readily understand that such Yurt may be divided into two semi-circular halves, each of which is attached to the longitudinal segments disclosed in detail herein, to form the elongated, expandable segmented longhouse structures of the instant invention.

Figure 1:
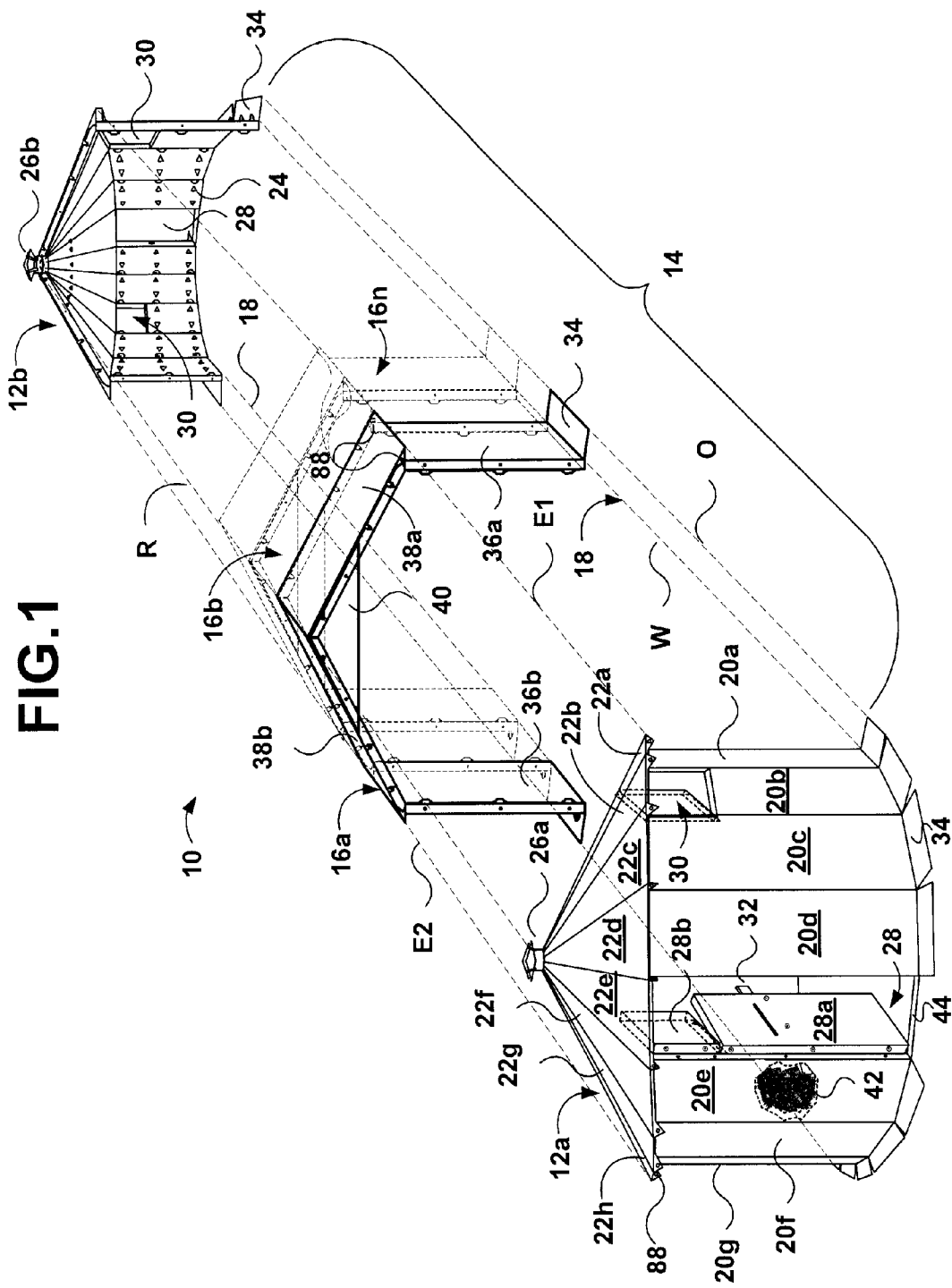
FIG. 1 is an isometric exploded view of an elongated, expandable segmented longhouse structure in accord with the principles of the invention, showing the spaced-apart semi-circular ends and the alignment of intermediate longitudinal segments, progressively in phantom.

FIG. 1 shows in an isometric view an implementation of the inventive elongated, expandable, segmented longhouse structure 10 comprising a first semi-circular, half-Yurt, end section 12a, which is spaced apart from a second, semi-circular, half-Yurt, end section 12b along a longitudinal central axis. Between the two end sections 12a and 12b is a straight, segmented section 14, comprising a plurality of straight wall and roof segment modules 16a, 16b . . . 16n. Each segment module comprises two opposed vertical wall modules joined along a central ridge line by inclined pairs of roof modules secured to the top of the walls and inclined upwardly to meet at the ridge line, forming a sloped roof that matches the slope of the end section roofs. The eaves lines, E1 and E2, the roof ridge line R, the wall line W and the hold-down flap line 0, are each shown in dashed lines. The circumferential wall line of the two semi-circular end sections taken together with the intermediate straight section defines the stadium-shaped footprint 18 of the inventive structure.

Each semi-circular end section 12a and 12b comprises modules of vertical, rectangular wall panels 20a-20g fastened to corresponding triangular roof panels 22a-h at the top of each wall panel member. Adjacent wall and roof panel modules are fastened together with bolts, accessible from the interior via die cut access portals (partial circular cuts) 24 in the inner wall of the module, seen in the far semi-circular section 12b, and in FIGS. 7A, 7B, and 8A below. This feature is disclosed in more detail in the co-pending U.S. Ser. No. 12/692,064. A roof vent assembly 26a, 26b is provided in the center of each semi-circular end section 12a, 12b. The tips of the roof panel modules 22a-h engage a collar member of the roof vent assembly 26a, 26b. The semi-circular end section 12a is shown with an optional door module 28 and window module 30. In this exemplary embodiment, the door is a dutch-type door, having a lower section 28a and an upper section 28b. The door module also includes a slide-type latch mechanism, 32. The base of each wall module 20, 36 includes an outer flap 34 which serves two functions: an extension of the wall on which weights may be placed to assist in holding down the structure, and as a water proof splash plate protecting the ground below the eaves from being washed away by rain dripping off the roof, 22, 38.

The straight segment section 14 includes at least one, preferably a plurality of, straight segment modules 16a . . . 16n, each of which comprises a vertical wall panel module 36a, 36b, and inclined roof panel modules 38a, 38b. The wall panels are bolted to adjacent wall panels, either like straight segment modules or at each end of the strait section 14, the wall panel of the end sections 12a, 12b, respectively. The inclined roof panels 38a, 38b are bolted to each other along the ridge line, and adjacent their outer ends to the top of each wall panel 36a, 36b, respectively. The adjacent straight segment modules, comprising a pair of spaced wall panels and joining inclined roof panels assembled together as a unit, are then fastened to adjacent straight segment modules, to make the linear center section of the longhouse structure. Optional reinforcing gussets 40 may be strategically placed between adjacent straight segment modules as needed, and fastened in place when adjacent module roof panels are fastened together.

The wall and roof panel modules have spaced apart, inside and outside walls in the range of from about 1" to about 8", 3"-6" being preferred. The intermediate interior of the panel modules may be filled with insulation 42, shown in a wall panel 20e of the near-end section of the structure. That interior wall space may also be filled or partially filled with light-weight concrete to add structural strength and to prevent wind from moving or damaging the structure. Thus, wall interiors filled with light weight concrete up from the bottom to a height on the order of 1-2' add substantial mass to reduce blow-down instances. The concrete may be cast in place using the wall panel modules as forms (self-formed), or concrete rubble, gravel, sand, till or compactable (low moisture) dirt may be used.

The ground should be sloped away from the walls so that rainwater is directed away from the finished, erected structure. It should be noted that where the use of the inventive structures is for human habitation or goods storage, the structure is erected over a water proof ground sheet or tarp (not shown), or other impervious (preferably indigenous) flooring material. The ground sheet may be co-extensive with the longhouse footprint, or extend beyond its perimeter, 18, F as shown. Where the longhouse is used as an animal pen, the ground cloth may be omitted. For a single sheet thick door panel, such as for an interior tunnel entry door or pass-through door in a room divider panel, additional flap(s) at the base of the door panel 28a is folded back on itself, once for a kick plate reinforcement, and twice, along lines parallel to the door bottom, to form a triangular tube which reinforces the bottom of the door. In the case of use of such a triangular tube on an exterior door, that tube shape also deflects rainwater away from any gap at the bottom of the door.

Optional guy lines may be used to further secure the structure in windy environs, The line is extended from holes 88 in the projecting ends of the gutters that are seen in FIGS. 1, 3, 5, 9A and 9B at the eave ends of the triangular roof panels in end 12a, to appropriate ground pegs or other available trees, rock formations and the like. Optional guy lines can also be attached to the gutter ends, formed from the extension of the roof rafters extending beyond the eave line, of any adjacent segment pairs.

One or more of the wall panels 20b may include an optional window panel 30. As shown, the window panel 30 is die cut along one side, the bottom and the top, so that it may be opened by folding out, or in, as shown, along one vertical edge. Two sides and the bottom may be die cut in order for the window to be folded outwardly as a shutter, which can be propped open with a stick so that it closes automatically by gravity. Optionally, screening or transparent sold sheeting may be used to cover the opening of window panel 30, and the panel itself serves as a shutter. The window material may be light weight transparent plastic sheet that is glued or fastened to the exterior wall by conventional fasteners or glue (not shown), as needed. This embodiment of the window system may include a compressible, foam plastic sealing strip that includes self-stick adhesive having peel-off cover strip on opposed sides. The cover strip is peeled off one side of the foam strip, which is then placed adjacent the marginal edge of the sheet of window plastic all around the perimeter. The exposed cover strip is then peeled off and the window aligned with the appropriately smaller opening and pressed onto the wall. Edge clips may also be used to secure the window over the opening.

The side casing of the doorway is reinforced at the bottom by upturned flaps in the blank and opening spacing is maintained by a thresh-hold (footer) strip 44, which has upturned ends or lap panels that are fastened to the vertical wall panel marginal flaps. This footer assembly 44, is preferably double or triple-folded in the center portion that lies on the ground and the upturned lap ends are preferably double-folded to provide sufficient rigidity to keep the wall panels to each side of the door properly spaced-apart in position. In addition, an inverted footer assembly is used over doorways and window top framing spanning the gap wherever a door, tunnel or window replaces a modular wall section or segment.

In one embodiment of the inventive material used for the walls and roofing panel modules, the cellular extruded plastic sheeting is translucent milky white, so that a pleasant diffuse light suffuses the interior of the longhouse structure. This also permits the structure to be used as a plant propagation structure, in the nature of a greenhouse, or an early-starter structure in cold climates.

Figure 2:
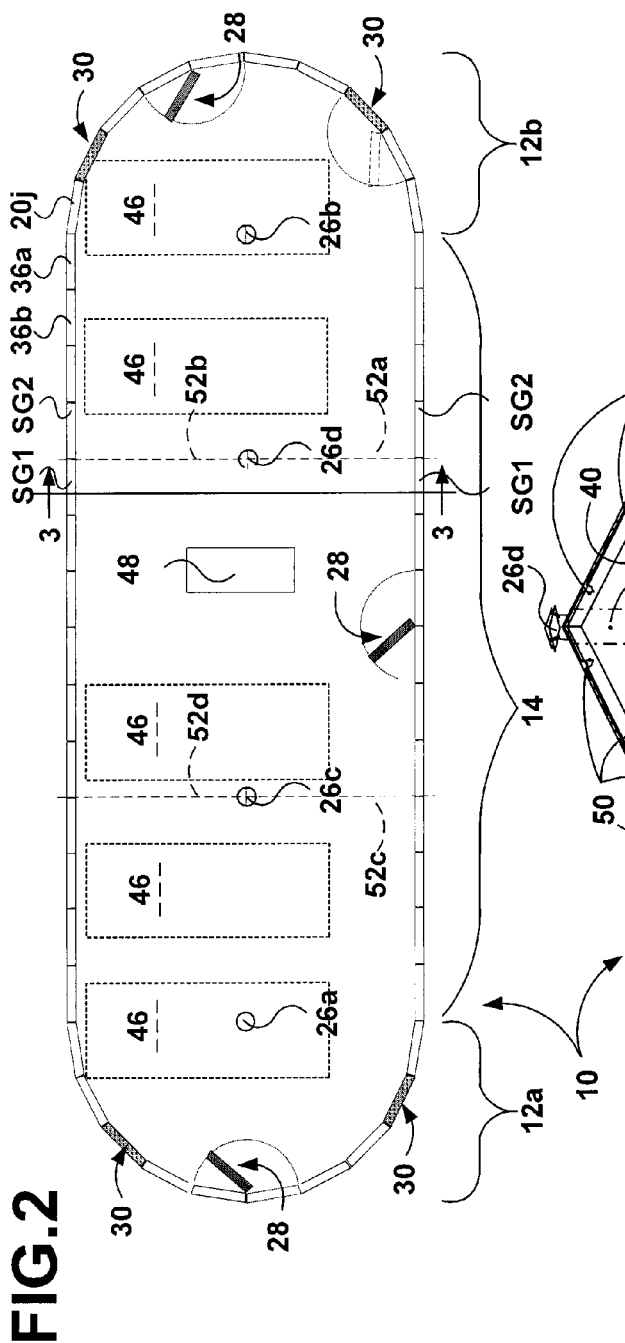
FIG. 2 is a plan view "footprint" of the elongated, expandable segmented longhouse structure of FIG. 1 showing the double wall feature, a door and windows at each end, and exemplary placement of bunks in the interior.
Figure 3:
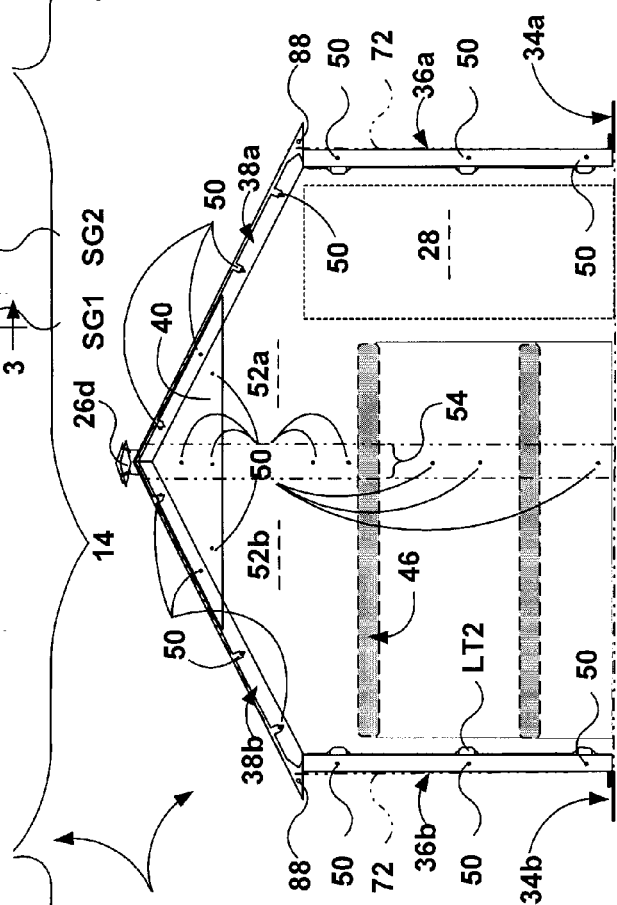
FIG. 3 is a vertical elevation of the longhouse structure of FIGS. 1 and 2 taken through the line 3-3 of FIG. 2.

FIGS. 2 and 3 show, respectively, a plan view in FIG. 2 and a vertical elevation in FIG. 3 of an exemplary longhouse structure 10 of the invention. FIG. 2 shows the three sections, ends 12a, 12b and the intermediate segmented straight section 14. Each end section is shown with two windows 30 and a door 28. Roof vents 26a and 26b are shown. Bunk beds 46 are shown (in dashed lines) placed within the interior in an exemplary arrangement. A common-use table or heating/cooking stove is shown at 48. In FIG. 3 a gusset 40 is shown installed between the intersection of the end section 12b and the mating end of the straight section 14. FIGS. 2 and 3 also show the optional use of one or more room dividers 52 (see FIG. 5 for more detail). In this example, four half-room-width room divider panels arranged as two pairs 52a, 52b and 52c, 52d. In this example, 52a, 52b are each secured at an outside edge 72 between adjacent segment wall and roof panels SG1, SG2, and are fastened to each other in overlap area 54 by fasteners 50 at the center. Note the room divider panels are secured to the gusset 40 by fasteners 50 at the top of each. A door 28 is optionally shown in one of the room divider panels, 52a. Note that by placement of the room divider panels 52, the longhouse of FIG. 2 is divided into three rooms, left with two bunks, center with one bunk and a table/stove, and right with two bunks, and an interior door to the center room. Thus, the inventive longhouse is universal, in that it may be divided into multiple work or living spaces, each of size N-Segments, as needed for the needed function.

The static, conical vent 26 may be any type vent, including an axially rotating type turbine vent. Where center venting is not desired, the piping may be closed off, or a smaller diameter solid plug having a compression ring flange provided, The exterior of the plug may include a "hat" type conical sheet member (of the shape shown in FIGS. 1 and 3) to assist in preventing rain and snow melt entry at this center intersection of the several roof module panels, whether straight or semi-circular. Where mechanical heating is provided by fire or other form of energy requiring a stove pipe, the central vent tube must be double- or triple-walled to prevent heat damage to the surrounding roof, the annulus between the inner and outer tube permitting drawing in cool exterior air to the fire box. FIG. 2 also shows optional additional roof vents 26c and 26d disposed between adjacent segments, on the right center, segments SG1 and SG2. The roof aperture may be a square cut-out formed by notching the meeting four corners of the four roof modules, and that can transition into a round vent tube in a conventional manner. The square to round transition can be masked-off by a round cut out in the FIG. 5 ridge cap blank 56.

FIGS. 4A and 4B show the blank for a ridge cap 56 which is characterized as having a center segment 58, that is as long as a roof panel is wide, and marginal flaps 60 at each end which fold down along pre-creased fold lines 62. The blank 56 is also folded along the ridge line pre-creased fold line 64. A tab 66 fits over the next adjacent ridge cap blank. Two folded ridge caps 56a, 56b are shown in FIG. 4B with the tab of 56b overlying the back of ridge cap 56a. The end flaps 60 are shown folded down with the holes 70 aligned to receive fastening bolts 50 that secure adjacent roof panels together (optionally with a gusset 40), as shown in exploded view in FIG. 5. Optionally, the right flap 60 may include a notch 68 or be slitted parallel to the fold line 62 to permit the tab 66 of ridge cap 56b to underlie, rather than overlie, the main panel 58 of the facing ridge cap 56a

FIG. 5 shows an entire straight section segment module 16n in the assembled condition, with the ridge cap 56 exploded away, and a gusset in place. The ridge cap is emplaced before the segment module is secured to an adjacent segment, so that the top two fasteners also engage the flaps 60 of the ridge cap. In this embodiment the top four fasteners engage the gusset 40. Note the double-wall panel structure of both the wall and roof panels, and the fastening, via bolt assemblies 50, of the two roof panels 38a, 38b together along the ridge line and at the eave line to the top of the wall panels 36a, 36b.

FIG. 6 shows a blank for an interior room divider sheet or panel 52, having a right side wall margin that is fastened between adjacent segment wall panels 36 via holes 70a (see also FIG. 12), a top margin 76 that is fastened between adjacent segment roof panels 38 and to the gusset 40 via holes 70b, and optionally to an overlapping second room divider 52b extending centrally from the opposite wall (see FIGS. 2 and 3) along its inner margin 74 (in overlap area 54 of FIG. 3) via holes 70c.

FIG. 7 shows a blank for a triangular form roof panel gusset 40 in which the upper margins 80a, 80b are fastened between adjacent roof panels 38 via holes 70d, the upper two holes also aligning with the holes 70 in the flaps 60 of the ridge cap unit 56, as seen in FIG. 5 and with room dividers. The holes 70 align with holes 70b and 70c in the top of the room dividers 52a and 52b as seen in FIG. 3. Optionally, the bottom margin of gusset 40 may be a concave-down arc, 90.

Figure 8A:
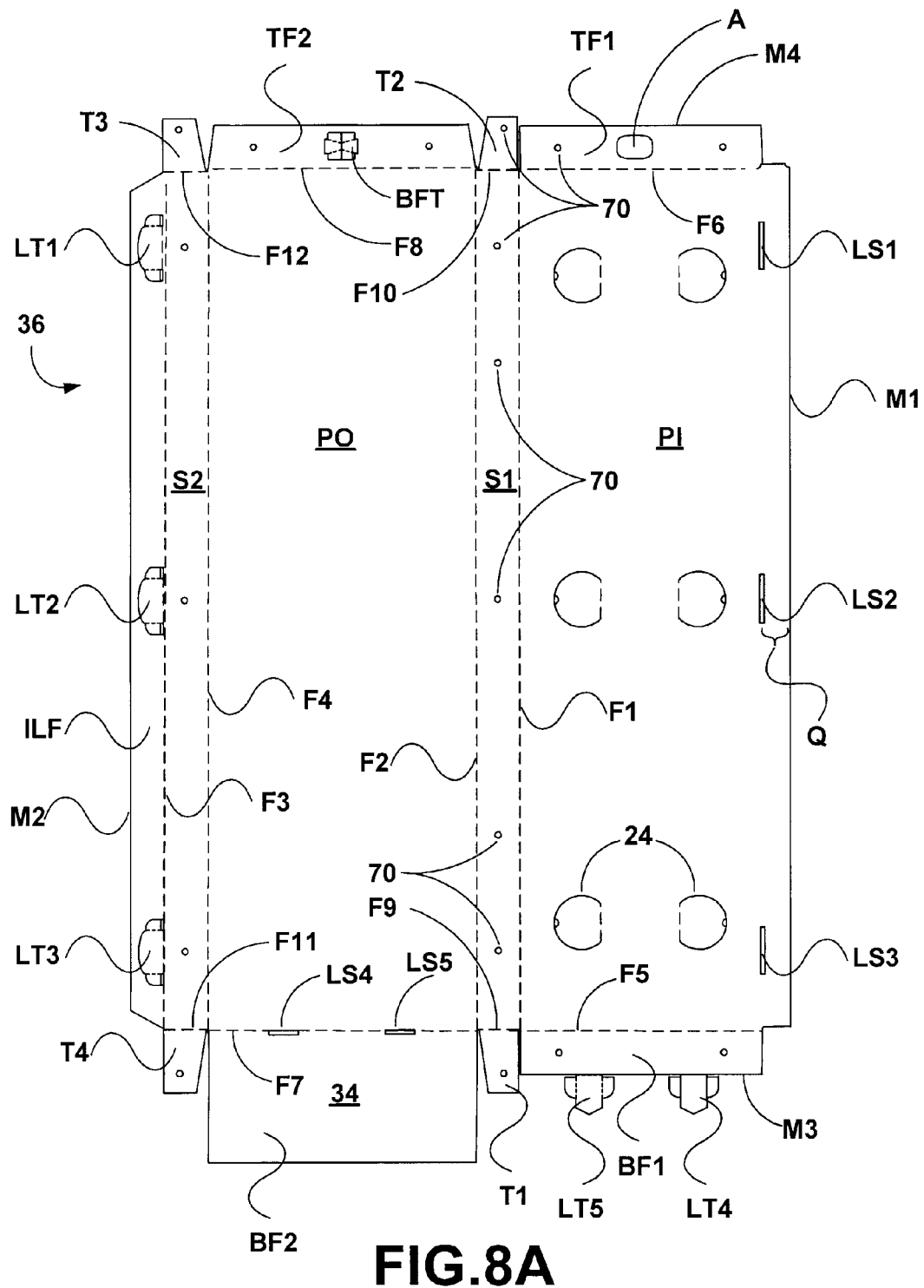
FIG. 8A is a plan view of the die cut sheet material from which a longitudinal double-walled wall segment is formed.

FIGS. 8A and 8B show a blank and an assembled double-walled, box-construction panel, respectively, of a wall panel module 36 for a segment of longhouse straight segmented section 14. The blank of FIG. 8A comprises a pair of rectangular panels PI, the inner wall face panel, and PO, the outer wall face panel. Both panels length is the pre-selected eave height, e.g., 6-7', while the width is the pre-selected width of the segment, e.g., 19". The panel PI includes a plurality of partial circular die-cuts to provide access flaps 24 for installation of fasteners through the holes in the side walls to secure them to adjacent modular segments and to secure together top and bottom folded panels, flaps and tabs. Between and joined to both panels PI and PO is first side panel S1, which is of width the pre-selected hollow thickness of the finished wall, e.g. 3-6". Side panel S1 is bounded on its opposite longitudinal margins by pre-scored fold lines F1 and F2. Adjacent but spaced inwardly from the outer longitudinal margin M1 (the right margin in FIG. 8A) of the blank are lock slots LS1-LS3 which correspond to and aligned with locking tabs LT1-LT3 which are spaced inwardly from the opposite longitudinal margin M2 of the blank. A sequential pair of parallel, pre-scored fold lines F3 and F4 are spaced inwardly from the blank longitudinal margin M2 (the left margin in FIG. 8A), the width between the margin M2 and fold line F3 defining an inter-lock stop flap ILF, the width of which is selected to be wider than the butterfly locking tabs LT1-LT3 so the flap is unbroken in its longitudinal dimension. Between the flap ILF and the main body of the outer panel PO is a pre-scored fold line F4, which is spaced from F3 the same width as panel S1, to form the left side S2 of the as-folded completed panel module.

At each of the top and bottom ends of the blank are sets of three flaps defined by pre-scored fold lines inwardly from the bottom margin M3 and the top margin M4. The bottom flap BF1 and top flaps TF1, TF2 are the same width as the interior thickness of the wall, that is, spaced inwardly from their respective margins M3 and M4 to provide flaps the same width as the side wall panels S1, S2. The bottom flap is defined by pre-scored fold line F5, while the top flaps TF1 and TF2 are defined by coaxial fold lines F6 and F8. The bottom flap BF1 includes die cut butterfly locking tabs LT4 and LT5 that are disposed to align with corresponding locking slots LS4 and LS5 disposed along fold line F7 at the bottom end of outer wall face panel PO. The bottom flap BF2 is larger so that when folded along its defining pre-scored fold line F7 under the flap BF1, it extends out beyond the outer face PO of the wall to form the base flap 34 as seen in FIGS. 1-5, on which rocks, gravel, sand or earth is placed to help hold the structure down in windy environments. FIG. 3, 34*a*, 34*b* illustrate the base flaps in vertical elevation.

Note that the bottom and top fold lines F5, F7 and F9 comprise a single coaxial fold line. Similarly fold lines F6, F8 and F10 are single coaxial fold lines. The top flaps TF1 and TF2 are formed between the outer margin M4 and the respective fold lines F6 and F8; these flaps are the width of the space between the outer face and inner face panels PI, PO, that is, equal in width to side walls S1 and S2. An aperture A is cut in top flap TF1 to receive and lock the push-type butterfly locking tab BT formed in a correspondingly aligned position in top flap TF2.

Tuck flaps T1-T4 are formed at the top ends, respectively, of the side panels S1 and S2, being defined between the margins M3 and M4, respectively and pre-scored fold lines F9-F12. These tuck flap fold lines are coaxial with the fold lines at the bottom and top of the wall face panels, PI and PO, as shown. These tuck flaps are stabilizer flaps, serving as box end flaps to maintain proper wall thickness at top and bottom. Note each end flap, with the exception of the bottom flap BF2 includes at least one hole 70 placed in aligned relationship to holes in the other end flaps to which they fold, in order to receive fastening bolts there-through. The bolts used at the top end of the formed wall panel also engage aligned holes in the ceiling (inner) face panel of the roof module, as seen in FIGS. 9A and 9B in order to tie the wall and roof panels of a segment together. The holes in side panels S1, S2 permit fasteners to secure one segment to adjacent segments (or an end portion 12*a*, 12*b*) via access through flaps 24 on the inner face panel PI. Note the flaps 24 are strategically placed to permit hand access to the interior of the top, bottom and sides of each wall panel.

The box construction of the wall module 36 is formed by sequential folding a plurality of pre-creased fold lines F1-F12 as shown in FIG. 8B. With the blank flat on the ground as seen in FIG. 8A, and comparing that to the finished module in FIG. 8B, panel PI is folded up 90°, toward the viewer along fold line F1. Then panel S1 is folded up 90° along fold line F2 so that panel PI is parallel to panel PO. Panel ILF on the left is folded up 90° along fold line F3, leaving the butterfly locking tabs LT1-3 in the same plane as panel S2. Then panel S2 is folded up 90° along fold line F4, so that the tabs LT1-LT3 are pointing vertically up toward the viewer, and the flap ILF is now facing right and is placed under the overlapping panel PI. The small side wings of the three butterfly locking tabs LT1-LT3 a folded and pushed through the corresponding locking slots LS1-LS3 of panel PI so that the marginal edge M1 lies to the left of the side S2.

The boxed top and bottom ends of the module are then formed as follows: The tuck flaps T2 and T3 are folded in 90° to the interior of the module. The top flap TF1 is folded in 90° over the tuck flaps, then the top flap TF2 is folded 90° over TF1, and the butterfly tab BT is pushed through the aligned anchor hole A to engage the sides of the hole and secure the top end of the module with the holes 70 in the tuck flaps aligned with the holes in each of the top flaps.

It should also be noted that where the aperture A for push tabs BT at the top of the wall module is aligned with a coordinate hole in the soffit (eave) flaps of the roof module (see below), upon opening one or more of the lower access flaps 24 at the bottom of the wall modules, the double walled construction provides passive ventilation. As shown in FIG. 1A, the hollow between the interior and exterior wall panels may be filled with insulating material in cold weather, including native materials such as moss or grasses via the access flaps 24. Likewise, the access flaps also permit introduction of concrete, gravel or sand weighting materials into the wall interior volume.

At the bottom end of the wall module, the tuck flaps T1 and T4 are folded in 90° to the interior of the module. The bottom flap BF1 is folded in 90° over the bottom tuck flaps, and the butterfly locking tabs LT4 and LT5 are inserted through the locking slots LS4 and LS5 and the wings spread. Then the ground flap BF2 is folded down, that is outwardly, beyond the face of the outer panel PO.

In an alternative embodiment, the two bottom panels BF1 and BF2 can be swapped, that is BF1 is an extension of panel PO, while BF2 is an extension of panel PI. In this embodiment, the ground flap folds outwardly as before, but crosses under the flap BF1 so that the bottom of the module has two layers of sheet material resting on the ground.

When the module 36 as formed in FIG. 8B is secured to another module on its left, the flange Q of the inner panel PI extending beyond the locking tabs and slots LT1-LT3/S1-S3 contacts the inner face of that adjacent panel, creating a seal the full vertical length of the module. In an alternate embodiment, where the panel S2 is slightly narrower than S1, e.g. 1/16", this flange Q has to flex in contacting the face of the adjacent panel to the left, forming a pressure seal formed by the flexing of the sheet material flap or flange when conforming to the surface of an adjoining panel or module sheet. Note also that the inner locking flange ILF completes that sealing feature, since it flexes when the inner and outer faces of the module are drawn together by the butterfly locking tabs on that side, top and bottom, LT1-LT5 and BT. Together the flanges ILF and Q form a very robust seal.

FIGS. 9A and 9B show a pair of blanks, which are mirror images as folded ready for assembly, first exploded apart FIG. 9A, and then as an assembled panel FIG. 9B, respectively, of a roof module 38 for a segment of straight section 14. Note the interior ceiling sheets need not be exactly parallel to the exterior roof sheets, in which case the interior ceiling sheets are cut slightly smaller to compensate for them being laterally offset. However, the following description relates to the preferred case where the exterior and interior sheets are substantially identical, it being understood that in the case where the sheets are not identical in size or exact configuration, the formation of the interleaving side V- and A-flaps to form the roof rafters is essentially the same.

The rectangular roof module 38 comprises roof outer face panel RFP and ceiling inner face panel CFP. Both roof module panels have a ridge end 82 and eave end 84. The ridge end 82 of each panel includes ridge end flaps RF1 and RF2, like the wall module, which are overlapped to form a box end. Fasteners are received through holes 70 in the ridge end flaps for bolting to a second roof module along the ridge line. The ridge line thus includes four layers of the sheet goods securely fastened together, forming a strong multi-layer ridge beam. The eave end 84 includes large eave flaps EF1 and EF2 which are overlapped to form the eave overhang. One of the top flaps of the wall module 36 may include an enlarged panel, e.g., TF1, which extends beyond the wall outside panel PO as a wall eave flap WEP that is interleaved above EF1 and below EF2. All 4 of the flaps are secured with fasteners passing through the aligned holes 70 in each of the flaps.

As seen in FIG. 9A, along the left side margin of the roof panel RFP is a down-folded side interlock flap SIF1, while the corresponding left side margin of the ceiling panel CFP has an up-folded side interlock flap SIF2.

Note along the right marginal edge of roof panel RFP, a pair of side flaps SVF are folded first up, then down to form them into a U, or rounded-bottom V, while the reverse folds, down/up forms a pair of side flaps SAF along the similar creases in the corresponding ceiling panel CFP into an inverted-U or rounded-top A-shape (an ∩-shape, called herein "an A-shape"). The U- or V-folded SVF flaps create an upturned slot in RFP, while the ∩-folded SAF flaps (A-shape) create a downturned slot in CFP.

Assembly comprises placing the roof panel RFP over the ceiling panel CFP, with the right marginal ∩(A-shape) flap pair SAF of the ceiling panel CFP being placed in loose contact with the right face of the U or V flap pair SVR of the roof panel RFP. Then single side edge flaps SIF1 and SIF2 of the next adjacent module (in this case that would be one to the right) are interleaved into the SVF and SAF slots, forming a six-layer roof rafter which is fasened with bolts. Correspondingly the single side edge flaps SIF1 and SIF2 shown in FIG. 9A are interleaved with an adjacent (to the left) roof module's SVF and SAF slots, and that six-layer roof rafter is fastened together. Note the eave end 86 of the SVF flaps projects below the soffit underside of the eave line E to form a rain gutter discharge point. The assembled roof module 38 is shown in FIG. 9B with SVF and SAF folded panels that form longitudinal slots adjacent the right margin of the panels RFP and CFP ready to receive the single edge flaps SIF1 and SIF2 of the next adjacent (to the right) module (not shown). The tie-down hole 88 is shown at the eave end of the rafter assembly.

The roof module assembly continues in pairs, one on each side to meet along the ridge line, as convenient, along the entire straight section 14, placing the interior sheets PI down and interleaving the exterior sheets PO. Alternately, the entire roof interior panel sets can be assembled on the ground by interleaving, and the entire roof exterior panel sets assembled by interleaving, then the exterior is fitted over the interior and the bolts inserted and only partly tightened until the entire roof assembly is lifted in place. Thereafter, final adjustments and alignments made, then the bolts are tightened from the interior. The result is a roof structure supported by an orthogonal array of multi-layer interior rafters, which renders the roof sufficiently strong to sustain heavy loads. In actual tests, a 200# man can stand on the roof. Likewise, the roof will carry heavy snow loads.

Optionally, screened soffit vent holes may be provided as needed in flaps EF1 and EF2 to vent the space between the exterior roof panel RFP and the interior ceiling panel CFP. However, as both sheets are made of double walled, cellular plastic sheeting, there is little concern for rot so that such vent holes are not necessary for satisfactory functionality of the inventive segmented longhouse structure. As described above, vent caps 26 may be placed along the ridge line, preferably at a juncture of four roof modules, but optionally may be placed medially of a segment roof, either at the ridge line or through a roof module. In the latter case, radial star cuts, also known as a "pizza cut", is made in the roof and ceiling panels of the roof module, the points trimmed and pushed up on the exterior and down on the interior to grip the vent tube.

Figure 10:
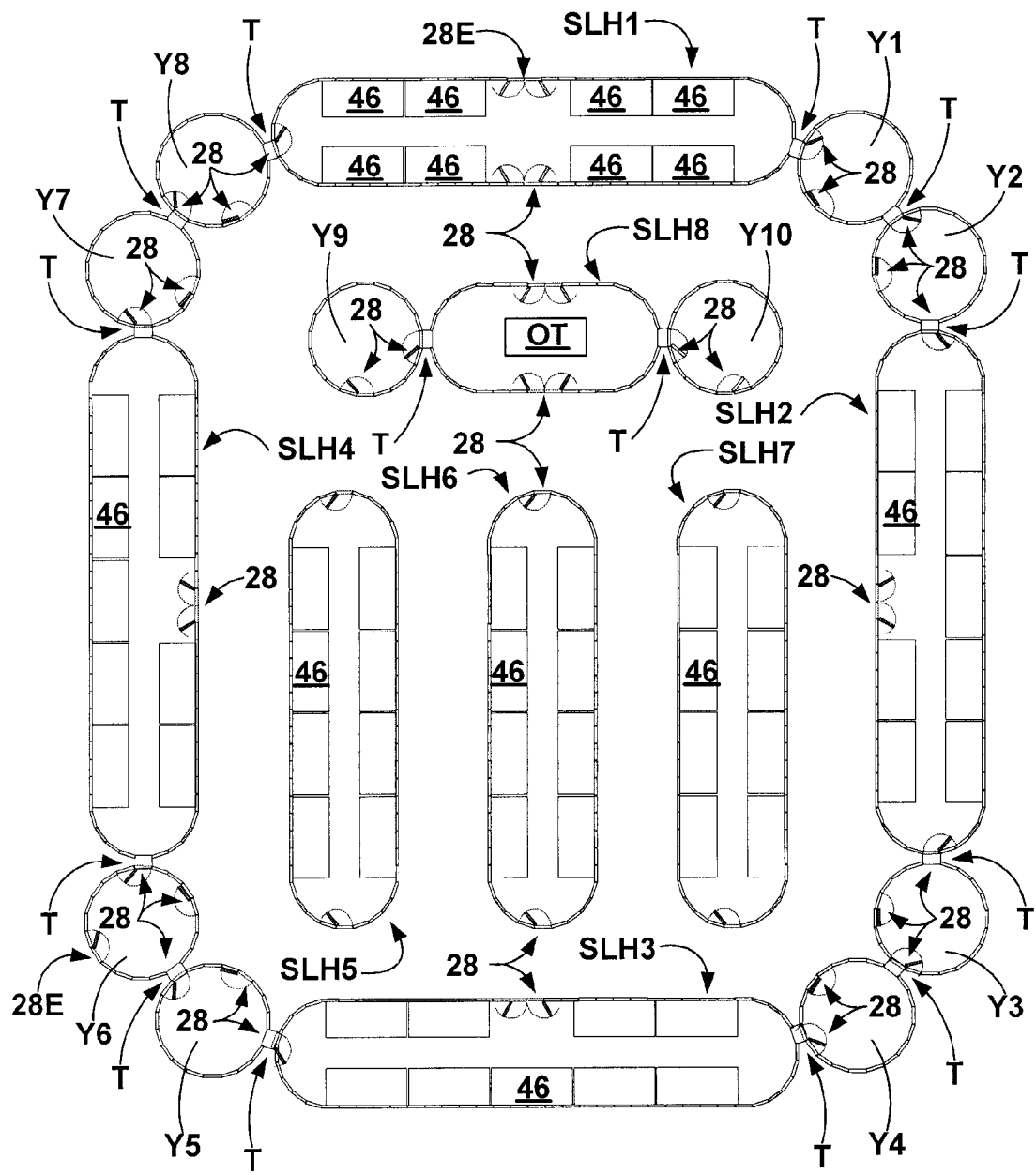
FIG. 10 is a plan footprint view of an exemplary cluster of the inventive longhouse structures forming a compound used as a field hospital: four longhouse structures form sides of a square, and they are joined at their ends by pairs of round Yurt-type structures; in addition, three more longhouses are arrayed in the interior courtyard space, and a fourth, shorter longhouse, having double doors on the longitudinal sides with a round Yurt at each end, is placed normal to the three courtyard longhouses.

FIG. 10 shows in plan view a complex of the inventive segmented longhouses SLH1-SLH7 associated with round Yurt-type structures Y1-Y10 of U.S. Ser. No. 12/692,064 located at the ends of an outer ring SLH1-SLH4 to form a field hospital compound, e.g., for military or civilian disaster relief triage service. At the top of the figure, one 20-segment longhouse SLH1, having a double door entry access 28E made from two adjacent segment wall modules, serves as a triage receiving room that has 8 examination stations. SLH1 also includes a two segment wide double door 28 for access to an adjacent, shorter 8-segment longhouse structure SLH8, serving as an operating theatre, OT. SLH1 and OT may be joined by a tunnel made of a plurality of inventive straight section segments.

The operating theatre longhouse OT (SLH8) has round Yurt-type structures Y9 and Y10 of U.S. Ser. No. 12/692,064 located at each end in communication via tunnel segments T that serve as supply and instrument storage and rest areas for staff. The operating theatre longhouse OT includes double-wide entry and exit doors 28, the latter opening into an interior courtyard space in which three 20-segment longhouses SLH 5-7 serve as post-op wards, each containing 8 hospital beds. The outer ring SLH1-SLH4 includes three more 25-segment longhouses SLH2-SLH4 for 9 beds each arranged around a square, with pairs of round Yurt structures Y1-Y8 at each corner. The round Yurts are interconnected to each of the outer ring longhouses by tunnel and door connector sections T, as shown in U.S. Ser. No. 12/692,064. Where each segment is 19″ wide, the outer ring 25-segment longhouses are each just over 45′ long by 10′ wide, the interior 20-segment ward longhouses are about 38.7′ long, and the 8-segment operating theatre longhouse is 20′ long. As necessary to accommodate use, the wall height to the eave, that is, the clear head-room at the interior of the side walls, may be any pre-selected height, typically in the range of from about 5′ to about 7′, and the exterior outer-wall-face to outer-wall-face is on the order of 10′. The height to the gusset bottom margin is the same or greater than the eve height (see FIG. 5), and can be increased to 8′ or more by providing the bottom margin of the gusset with an arcuate shape 90, as shown in FIG. 7. The end and corner Yurts Y1-Y10 provide room for administrative, storage, food preparation and sanitary facilities. Optionally, several windows may be provided as needed for view and air circulation into and through the structures.

For connector tunnels, straight section wall modules and shortened (in length) roof modules may be used. For a tunnel in a straight section, a pair of side by side wall modules are omitted for an opening 38" wide, and those are used as tunnel sides, joined to a similar pair from the to-be-connected structure, with additional connector sheeting strips being used to make the join, as needed. For a tunnel connector to a semi-circular portion wall, a single wall segment is omitted. In addition, each tunnel may have a privacy door at each end.

In the event of earthquake, tsunami, tornado, windstorm, flood or other natural disasters, the flat blanks for all these buildings can be air-lifted in by helicopter, and erected on site by local people; special skills are not needed. This permits rapid deployment of an emergency surgical suite for trauma victims. An entire kit of blanks, ready to ship, for the compound illustrated in FIG. 10 can be pre-packed, e.g., in shrink-wrap, and stored at National Guard airbases or Homeland Security sites for transport by helicopters, e.g. in cargo slings, to a disaster site. For example, assume a magnitude 8 or 9 earthquake off the Western Coast of Washington State or Vancouver Island, British Columbia that leveled the hospital in Port Angeles Wash., followed by a Tsunami down the San Juan de Fuca Straight that destroyed the port city of Port Angeles. A helicopter could transport an entire surgical and treatment suite as shown in FIG. 10 to the Safeway parking lot in uptown Port Angeles, to which by emergency management communications, medical personnel would make their way. Meantime local survivors could erect the entire suite, without training as all instructions are printed on the blanks and illustrated in diagrams, as additional helicopters brought in supplies and equipment as needed.

Note that the creation of open-space-enclosing configurations of the inventive longhouse, and longhouse plus round yurt structures permits formation of a relatively "defensible" perimeter formed by mutually inter-connected structures. Such a defensible perimeter is of use, for example, for animal husbandry and for the creation of a compound which is easily controllable. Such a compound is of use both to residents in dangerous social environments, such as refugee situations, and for aid personnel who must control relief materials stored inside.

Figure 11:
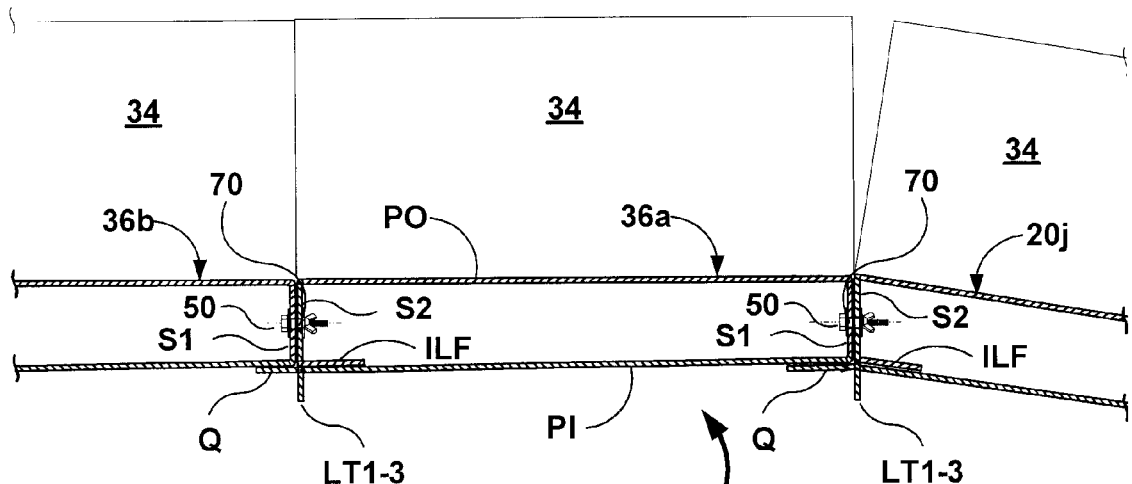
FIG. 11 is a horizontal section view through three adjacent wall modules, a full segment wall, a partial segment wall and a partial end portion (Yurt) wall, showing the details of the fastening assembly bolt, washers and wingnut.

FIG. 11 is a horizontal section view through an exemplary intersection of a straight section 14 with a semi-circular end portion 12, showing two straight segment modules 36a and part of 36b joined with a wall segment 20j of the end portion 12a. Inner wall sheet PI and outer wall PO are joined at each end with side panels S1 and S2, respectively. The inner locking flap ILF is shown folded back parallel to the inner wall while the seal flap Q extends to the adjacent module, and the locking tabs LT1-LT3 project through the corresponding slots. The fastening bolt/washer/wingnut assembly 50, here shown as hex bolts with wing nuts pass through aligned holes 70 in the respective sheets to secure the adjoining side walls together between large washers. The same fastening approach is used for securing together wall modules 36 to roof modules 38 at the top of each wall module, adjacent roof modules laterally to each other, along the ridge line and throughout the semicircular yurt end portions 12a, 12b.

Figure 12:
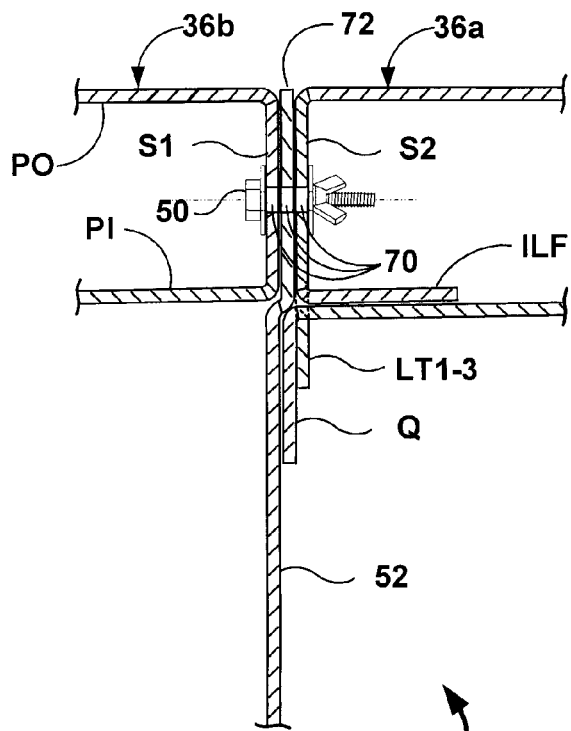
FIG. 12 is a horizontal section view through portions of two adjacent wall modules showing the inclusion of a room divider panel fastened between the join between the two modules.

FIG. 12 is an enlarged view of a connection between wall modules 36a and 36b. However, in this view, a wall divider panel 52 is inserted between the wall modules with the fastener holes 70 aligned to receive the bolt assembly 50. Note that the tab Q is bent inwardly (toward the inside of the structure) 90° so that it is intermediate the locking tabs LT1-LT3 and the wall divider panel 52. The bolt assemblies are inserted in holes 70 by access through ports 24, best seen in FIGS. 8A, 8B, 9A, 9B. A small half-moon cutout in the periphery of the die cut 24 permits pulling the port flap closed if it has been pushed into the hollow of the wall or roof module.

In its broad aspects, the invention comprises a combination of half-Yurt end sections joined by an intermediate, selectively expandable, straight section comprising one or more modular segments, and can be characterized as an improved, low cost, semi-permanent, rigid, double-walled, modularly expandable, light-weight, man-portable, field-erectable, structure having a multi-use interior useful space, comprising in assembled use combination: at least one end portion structure which is a semi-circle in plan view, said end portion comprising: i) a plurality of substantially identical generally rectangular double-wall side wall panel modules, said side wall panel modules having a box construction with an inner wall and outer wall, a horizontal bottom end, a horizontal top end, vertical lateral sides and a vertical height longer than its width defining an eave height, ii) said side wall panel modules being joined to each other along said vertical sides, and as conjoined, together defining a substantially continuous wall spaced a sub-stantially uniform radial distance from a common center along the circumference of said semi-circle, iii) a plurality of substantially identical double-wall roof panel modules, said roof panel modules having a box construction with an outer roof face and an inner ceiling face, iv) each said roof panel modules being a generally geometrical isosceles triangle as seen in plan view and having an outer marginal edge defining an outer eave edge, and two sides joining at said common center of said semi-circle, v) said roof panel modules being joined to the tops of said side wall panel modules adjacent said outer marginal edge with said eave edge projecting beyond said outer wall of said conjoined double-wall side wall modules, vi) said roof panel modules being conjoined to adjacent roof panel modules to form a generally conical semi-circular roof structure having a peak at said common center that is higher than said eave height and defining a support-free space interior of said inner wall and said ceiling; b) at least one straight section structure comprising a plurality of modular segments, each segment comprising: i) a pair of spaced-apart substantially identical generally rectangular double-wall side wall panel modules, said side wall panel modules having a box construction with an inner wall and outer wall, a horizontal bottom end, a horizontal top end, vertical lateral sides and a vertical height longer than its width defining an eave height that is substantially the same as the eave height of said end portion, ii) a pair of substantially identical double-wall roof panel modules, said roof panel modules having a box construction with an outer roof panel and an inner ceiling panel, iii) each said roof panel modules being a generally a geometrical rectangle as seen in plan view and having a width substantially equal to the width of said segment side wall panel module, an outer marginal edge defining an outer eave edge, two generally parallel sides and an inner ridge box end, iv) each of said roof panel modules being joined to the top of one of said pair of side wall panel modules adjacent said outer marginal edge with said eave edge project-ing beyond said outer wall of said double-wall side wall panel modules, v) the inner ridge box ends of said roof panel modules being joined to each other along a ridge elevated above said eave height to form a span having vertical side walls, and a sloped roof down from a generally straight ridge, vi) said straight section segment having a length between a first and a second side substantially equal to the width of said segment side wall panel module, and defining between said side edges, said spaced-apart opposed inner wall panels and said ceiling panels, a support-free space interior of said span; c) the diameter of said end portion semi-circle is substantially equal to the span width of said straight section segment; and d) said end portion structure is positioned with its diameter aligned with the span width of said straight section segment structure and said end portion structure is joined to said first end of said straight section segment structure along adjoining wall panel and roof panel modules to provide a longhouse structure that is stadium-shaped as seen in plan view, and whose longitudinal length is expandable simply by adding segments to said straight section structural portion.

INDUSTRIAL APPLICABILITY

It is clear that the inventive modular longhouse structures of this application have wide applicability to the temporary housing industry, namely survival shelters for campers, refugees and disaster victims. The inventive structures are light weight, can be easily carried into remote areas, are inexpensive, can be mass produced by modern carton-making equipment as they comprise a limited suite of die-cuttable panels. As such, the inventive structures have the clear potential of becoming adopted as the new standard for disaster and refugee shelters, meeting all UN relief shelter standards.

Still another use for the inventive rigid-walled structures is as event kiosks, such as trade shows, art fairs and festivals, or for temporary shelters at sports and entertainment events, medical triage, rest shelters and farm stands. For event kiosks, the interior and exterior walls, including room divider panels, of the structures provide flat surfaces for display of promotional materials, artwork or photos, billboards and the like, which may be printed directly onto the surface. Note also that partial structures may be used, as two or more wall panels are mutually self-standing as they cooperatively support each other. Thus, a semicircular or quarter circle structure may be used as booths, bus stop shelters, music band shells, and the like. In an important alternative, one semi-circular end portion, or part thereof, can be dispensed-with so that the structure is open at one end. Such a structure may be used as a garage, or walk-in/drive-in garage, as an animal shelter, for hay or other fodder storage, implement storage, festival or fair booth or event structure and the like.

It should be understood that various modifications within the scope of this invention can be made by one of ordinary skill in the art without departing from the spirit thereof and without undue experimentation. For example, the panels and modules can have a wide range of designs to provide the functionalities disclosed herein. Likewise, the sheet material of the individual panels may be made of any suitable plastic, and may be laminates rather than single extrusions. The window sheets or modules may be made of transparent plastic and window openings or modules may include sections of screen to selectively permit ventilation while providing insect barriers. Likewise the upper section of the Dutch door may include a hinged screen assembly. In addition, a set of die-cut blanks for modules required to construct a structure of this invention may be put together in a bundle as a kit. In either of the straight section or end portions, one or more entire, or a portion of a roof module may be constructed of transparent plastic to provide additional interior light, functioning as a skylight. The roof structures of the inventive structures are sufficiently strong to support PV solar panels, thereby making this structure largely energy self-sufficient. Guy lines may be strung through the holes in the gutter ends all around the structure, and then tensioned, to provide an additional tension ring reinforcement. This invention is therefore to be defined by the scope of the appended claims as broadly as the prior art will permit, and in view of the specification if need be, including a full range of current and future equivalents thereof.

APPENDIX A

PARTS LIST
Parts List (This Parts List is provided as an aid to Examination and may be canceled upon allowance)

| | |
|---|---|
| 10 | Inventive segmented longhouse structure |
| 12 | Semi-circular end portion |
| 14 | Segmented straight section |
| 16 | Segment module, 2 wall and 2 roof modules together |
| 18 | Stadium-shape structure footprint |
| 20 | Yurt end wall module |
| 22 | Yurt end roof module |
| 24 | Die cut access flap and portal (partial circle) |
| 26 | Roof vent assembly |
| 28 | Door module assy, single or double, dutch door |
| 30 | Window module assy |
| 32 | Slide latch for door assy |
| 34 | Base, hold down and drip flap |
| 36 | Individual wall module of strait section |
| 38 | Individual roof module of strait section |
| 40 | Roof gusset reinforcing panel |
| 42 | Insulation or weight material (concrete, gravel, sand) |
| 44 | Door Thresh-hold (footer), header, window header |
| 46 | Bunk |
| 48 | Table or stove |
| 50 | Fastener assembly (bolt, washers, wingnut or nut) |
| 52 | Room divider panel |
| 54 | Overlap of room divider panels 52a and 52b |
| 56 | Ridge cap blank |
| 58 | Length of blank center section |
| 60 | End margin flaps |
| 62 | Pre-creased fold line of flaps 60 |
| 64 | Pre-creased ridge fold line |
| 66 | Tab |
| 68 | Optional notch |
| 70 | Holes for fastener assys |
| 72 | Outer vertical margin of room divider panel 52 |
| 74 | Inner vertical margin of room divider panel |
| 76 | Top margin of room divider panel |
| 78 | Door pre-crease fold line |
| 80 | Top margin of roof gusset 40 |
| 82 | Ridge end of roof panels and module |
| 84 | Eave end of roof panels and module |
| 86 | Gutter ends (with optional hole for guy or tension line) |
| 88 | Holes in eave ends for guy lines |
| 90 | Optional arc bottom margin of gusset 40 |
| 92 | |
| SLH1-SLH7 | Segmented longhouse structures FIG. 10 |
| Y1-Y10 | Round Yurt structures, FIG. 10 |
| OT | Operating theatre longhouse, FIG. 10 |
| T | Tunnel structures joining SLH to Y or 2 SLHs, FIG. 10 |
| E1, E2 | Eave line |
| R | ridge line |
| W | wall line |
| O | outer margin line formed by flaps 34 |
| PO | wall outer face panel or sheet |
| PI | wall inner face panel or sheet |
| S1 | side 1, right side in FIG. 8B |
| S2 | side 2, left side in FIG. 8B |
| ILF | interlock flap |
| LT1-LT5 | butterfly type locking tabs 1-5 |
| LS1-LS5 | lock slots for tabs 1-5 |
| A | aperture for butterfly lock BFT and vent for passive air |
| BFT | butterfly tab in top flap TF2 |
| T1-T4 | tuck flaps for box end construction |
| BF1 and BF2 | bottom end flaps BF2 = 34 |
| TF1 and TF1 | top end flaps |
| F1-F12 | prescored fold lines 1-12 |
| M1-M4 | outer margins of blank |
| RFP | roof face panel or outer sheet of roof module |
| CFP | ceiling face panel or inner sheet of roof module |
| SVF | roof module, RFP right side V-folded flaps |
| SAF | roof module, CFP right side A-folded Flaps |
| SIF1 and SIF2 | RFP and CFP side interlock flaps |
| RF1 and RF2 | ridge end flaps of roof module |
| EF1 and EF2 | eave end flaps of roof module |
| WEF | optional wall eave flap |

The invention claimed is:

1. An improved, low cost, semi-permanent, rigid, double-walled, modularly expandable, light-weight, man-portable, field-erectable, structure having a multi-use interior useful space, comprising in assembled use combination:
  a) at least one end portion structure which is a semi-circle in plan view, said end portion comprising:
    i. a plurality of substantially identical generally rectangular double-wall side wall panel modules, said side wall panel modules having a box construction with an inner wall and outer wall, a horizontal bottom end, a horizontal top end, vertical lateral sides and a vertical height longer than its width defining an eave height,
    ii. said side wall panel modules being joined to each other along said vertical sides, and as conjoined, together defining a substantially continuous wall spaced a substantially uniform radial distance from a common center along the circumference of said semi-circle,
    iii. a plurality of substantially identical double-wall roof panel modules, said roof panel modules having a box construction with an outer roof face and an inner ceiling face,
    iv. each said roof panel modules being a generally geometrical isosceles triangle as seen in plan view and having an outer marginal edge defining an outer eave edge, and two sides joining at said common center of said semi-circle,
    v. said roof panel modules being joined to the tops of said side wall panel modules adjacent said outer marginal edge with said eave edge projecting beyond said outer wall of said conjoined double-wall side wall modules,
    vi. said roof panel modules being conjoined to adjacent roof panel modules to form a generally conical semi-circular roof structure having a peak at said common center that is higher than said eave height and defining a support-free space interior of said inner wall and said ceiling;
  b) at least one straight section structure comprising a plurality of modular segments, each segment comprising:
    i. a pair of spaced-apart substantially identical generally rectangular double-wall side wall panel modules, said side wall panel modules having a box construction with an inner wall and outer wall, a horizontal bottom end, a horizontal top end, vertical lateral sides and a vertical height longer than its width defining an eave height that is substantially the same as the eave height of said end portion,
    ii. a pair of substantially identical double-wall roof panel modules, said roof panel modules having a box construction with an outer roof panel and an inner ceiling panel,
    iii. each said roof panel modules being a generally a geometrical rectangle as seen in plan view and having a width substantially equal to the width of said segment side wall panel module, an outer marginal edge defining an outer eave edge, two generally parallel sides and an inner ridge box end,
    iv. each of said roof panel modules being joined to the top of one of said pair of side wall panel modules adjacent said outer marginal edge with said eave edge projecting beyond said outer wall of said double-wall side wall panel modules,
    v. the inner ridge box ends of said roof panel modules being joined to each other along a ridge elevated above said eave height to form a span having vertical side walls, and a sloped roof down from a generally straight ridge,
    vi. said straight section segment having a length between a first and a second side substantially equal to the width of said segment side wall panel module, and defining between said side edges, said spaced-apart opposed inner wall panels and said ceiling panels, a support-free space interior of said span;
  c) the diameter of said end portion semi-circle is substantially equal to the span width of said straight section segment; and
  d) said end portion structure is positioned with its diameter aligned with the span width of said straight section segment structure and said end portion structure is joined to said first end of said straight section segment structure along adjoining wall panel and roof panel modules to provide a longhouse structure that is stadium-shaped as seen in plan view, and whose longitudinal length is expandable simply by adding segments to said straight section structural portion.

2. Improved modular structure as in claim 1 wherein said module panels are constructed of blanks die cut from planar sheets of self-standing, light weight, water-resistant plastic having a cellular core defined between smooth exterior and interior planar surfaces, said blanks having marginal edges and a plurality of pre-scored fold lines to define flaps and panel sections for folding to form said double-wall, wall and roof module panels.

3. Improved modular structure as in claim 1 wherein at least some of said wall module panels include an outwardly foldable ground flap, said ground flap permitting loading with objects to provide hold-down weight to assist in stabilizing said structure in windy conditions.

4. Improved modular structure as in claim 1 wherein said roof of at least one of said end portion structure and said straight section segment includes a vent assembly.

5. Improved modular structure as in claim 1 which includes a plurality of said straight section segments disposed with their span profiles aligned and joined along common sides of both wall and roof module panels to form a structure having a semi-circular first end and an elongated linear section extending therefrom.

6. Improved modular structure as in claim 1 which includes a second semi-circular end aligned with and secured to said second side of said straight section segment structure.

7. Improved modular structure as in claim 6 wherein said straight section includes a plurality of substantially identical segments conjoined along adjacent common sides.

8. Improved modular structure as in claim 1 wherein the space between walls of said double-walled modular panels ranges from about 1" to about 8".

9. Improved modular structure as in claim 1 which includes a closable opening assembly disposed in at least a portion of at least one said wall modular panels selected from said semi-circular end section and said straight section segment, said closable opening assembly being selected from at least one of a single panel, a dutch door having an upper and a lower panel, a door having a window panel or screen assembly, a door having a lock assembly, a window panel, a screen assembly, and a shutter assembly.

10. Improved modular structure as in claim 1 wherein said interior wall and said ceiling panels of said modules include partial circular cuts to define foldable flaps to permit access to the interior hollow space between said outer wall and inner wall and said roof and ceiling panels for access for fasteners to secure said wall and ceiling modules together.

11. Improved modular structure as in claim 6 which includes a covered tunnel structure bridging between two aligned entries of structures placed adjacent each other to provide a passageway there-between, and optionally at least one end of said passageway includes a hinged door structure.

12. Improved modular structure as in claim 10 which includes features selected from at least one of: a) said fasteners are bolt/washer/wingnut assemblies; b) a hole is provided in a roof rafter assembly adjacent the projecting eave end to provide a tie-down for a stabilizing guy line; c) a room divider panel member securable between adjacent wall and roof module panels, said room divider panel extending inwardly from said interior wall and ceiling toward the center of said room; d) a roof gusset reinforcing panel disposed interiorly of said structure secured between adjacent roof module panels; e) a ridge panel disposed along the ridge line of each straight section segment having flaps secured between adjacent roof module panels; f) said vent structure includes a conical top rain shield member; g) a strip disposed bridging an exterior wall entry selected from a threshold strip and a transom strip formed to stabilize the base or upper end of walls, as the case may be, forming the sides of said entry; h) an entry assembly comprising a double door disposed in place of a pair of side by side wall module panels; i) said structure is in the form of necessary die cut blanks collated to form said structure; j) die cut blanks are provided with necessary fasteners for assembly; and k) said roof gusset panel has a bottom margin that is arcuate-down to provide increased headroom in said structure interior.

13. Improved modular structure as in claim 1 wherein said wall and roof modular panels are configured in pre-selected sizes to provide a desired eave height, peak height, interior width and interior length of the as-assembled longhouse structure.

14. Improved modular structure as in claim 9 which includes a second entry positioned in alignment with an entry of at least one other of said structures with perimeter edges of facing roof modules in close proximity, said structures being positioned in a conjoined cluster configuration comprising N said structures, said wall and roof module panels of said cluster yurt structures being configured in preselected sizes to provide a desired eave and peak height, and structure diameter.

15. Improved modular structure as in claim 14 wherein at least one of said other structures is a round Yurt-type structures having a round footprint as seen in plan view.

16. Improved modular structure as in claim 14 wherein said structures are joined by a covered tunnel structure defining a passageway aligned with and connected to each of said entries, and optionally at least one end of said passageway includes a hinged door module.

17. Improved modular structure as in claim 14 wherein said structures are arrayed in a compound forming a structure-enclosed central open area.

18. Improved modular structure as in claim 17 wherein longhouse structures are interconnected at their semi-circular ends to other longhouse structures by at least one Yurt-type structure connected thereto by covered tunnel structures defining a passageways connected to entries in said longhouse and Yurt-type structures.

19. Improved modular structure as in claim 1 wherein all panels required to form said structure modules are provided in the form of a related bundle of die-cut sheets selected as a complete structure kit.

20. Improved modular structure as in claim 12 wherein all panels required to form said wall and roof modules are provided in the form of a related bundle of die-cut sheets selected as a complete structure kit.

* * * * *